US009760794B2

United States Patent
Lee et al.

(10) Patent No.: US 9,760,794 B2
(45) Date of Patent: Sep. 12, 2017

(54) METHOD AND SYSTEM OF LOW-COMPLEXITY HISTROGRAM OF GRADIENTS GENERATION FOR IMAGE PROCESSING

(71) Applicant: INTEL CORPORATION, Santa Clara, CA (US)

(72) Inventors: Teahyung Lee, Chandler, AZ (US); Myung Hwangbo, Lake Oswego, OR (US); Tanfer Alan, Darmstadt (DE); Omesh Tickoo, Portland, OR (US); Ravishankar Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/866,606

(22) Filed: Sep. 25, 2015

(65) Prior Publication Data

US 2017/0091575 A1    Mar. 30, 2017

(51) Int. Cl.
| | | |
|---|---|---|
| *G06K 9/00* | (2006.01) | |
| *G06K 9/46* | (2006.01) | |
| *G06K 9/42* | (2006.01) | |
| *G06K 9/48* | (2006.01) | |
| *G06K 9/62* | (2006.01) | |

(52) U.S. Cl.
CPC ............ *G06K 9/4647* (2013.01); *G06K 9/42* (2013.01); *G06K 9/4652* (2013.01);
(Continued)

(58) Field of Classification Search
CPC ...... G06K 9/4642; G06K 9/4647; G06K 9/46; G06K 9/6221; G06T 7/0085;
(Continued)

(56) References Cited

U.S. PATENT DOCUMENTS 3,631,233 A * 12/1971 McKenna ................. G06J 1/00
                                                                341/116
6,289,112 B1 * 9/2001 Jain .................... G06K 9/00087
                                                                382/116

(Continued)

OTHER PUBLICATIONS

Navneet Dalal, Bill Triggs. Histograms of Oriented Gradients for Human Detection. Cordelia Schmid and Stefano Soatto and Carlo Tomasi. International Conference on Computer Vision & Pattern Recognition (CVPR '05), Jun. 2005, San Diego, United States. IEEE Computer Society, 1, pp. 886-893, 2005.

(Continued)

*Primary Examiner* — Eueng-Nan Yeh
(74) *Attorney, Agent, or Firm* — Green, Howard & Mughal LLP

(57) ABSTRACT

Techniques for a system, article, and method of low-complexity histogram of gradients generation for image processing may include histogram of gradients generation for image processing including the following operations: obtaining image data including horizontal and vertical gradient components of individual pixels of an image; associating the horizontal and vertical gradient components of the same pixel with one of a plurality of angular channels depending on the values of the horizontal and vertical gradient components; determining a gradient magnitude and a gradient orientation of individual angular channels after the horizontal and vertical gradient components are assigned to the channels; and generating a histogram of gradients by using the gradient direction and gradient magnitude of the angular channels.

25 Claims, 11 Drawing Sheets

(52) U.S. Cl.
CPC ........... G06K 9/4661 (2013.01); G06K 9/481 (2013.01); G06K 9/6212 (2013.01); *G06K 2009/485* (2013.01)

(58) Field of Classification Search
CPC ... G06T 7/0083; G06T 7/0079; G06T 7/2066; G06T 5/40; H04N 1/4074; H04N 19/176
See application file for complete search history.

(56) References Cited

U.S. PATENT DOCUMENTS

| | | | |
|---|---|---|---|
| 8,774,510 B2 * | 7/2014 | Xu | G06K 9/3275 |
| | | | 382/170 |
| 9,135,726 B2 * | 9/2015 | Kafuku | G06T 11/00 |
| 2014/0072217 A1 | 3/2014 | Xu et al. | |
| 2014/0254927 A1 | 9/2014 | Bhardwaj et al. | |
| 2015/0071528 A1 * | 3/2015 | Marchisio | G06K 9/6269 |
| | | | 382/159 |
| 2015/0071538 A1 | 3/2015 | Marchisio et al. | |
| 2015/0092982 A1 | 4/2015 | Kang et al. | |

OTHER PUBLICATIONS

International Search Report and Written Opinion for International Patent Application No. PCT/US2016/048703, mailed Dec. 6, 2016.
Rodriguez, J et al., "Local gradient histogram features for word spotting in unconstrained handwritten documents", In: 11th International Conference on Frontiers in Handwriting Recognition. Aug. 19, 2008-Aug. 21, 2008 See sections 4.2-4.4.

* cited by examiner

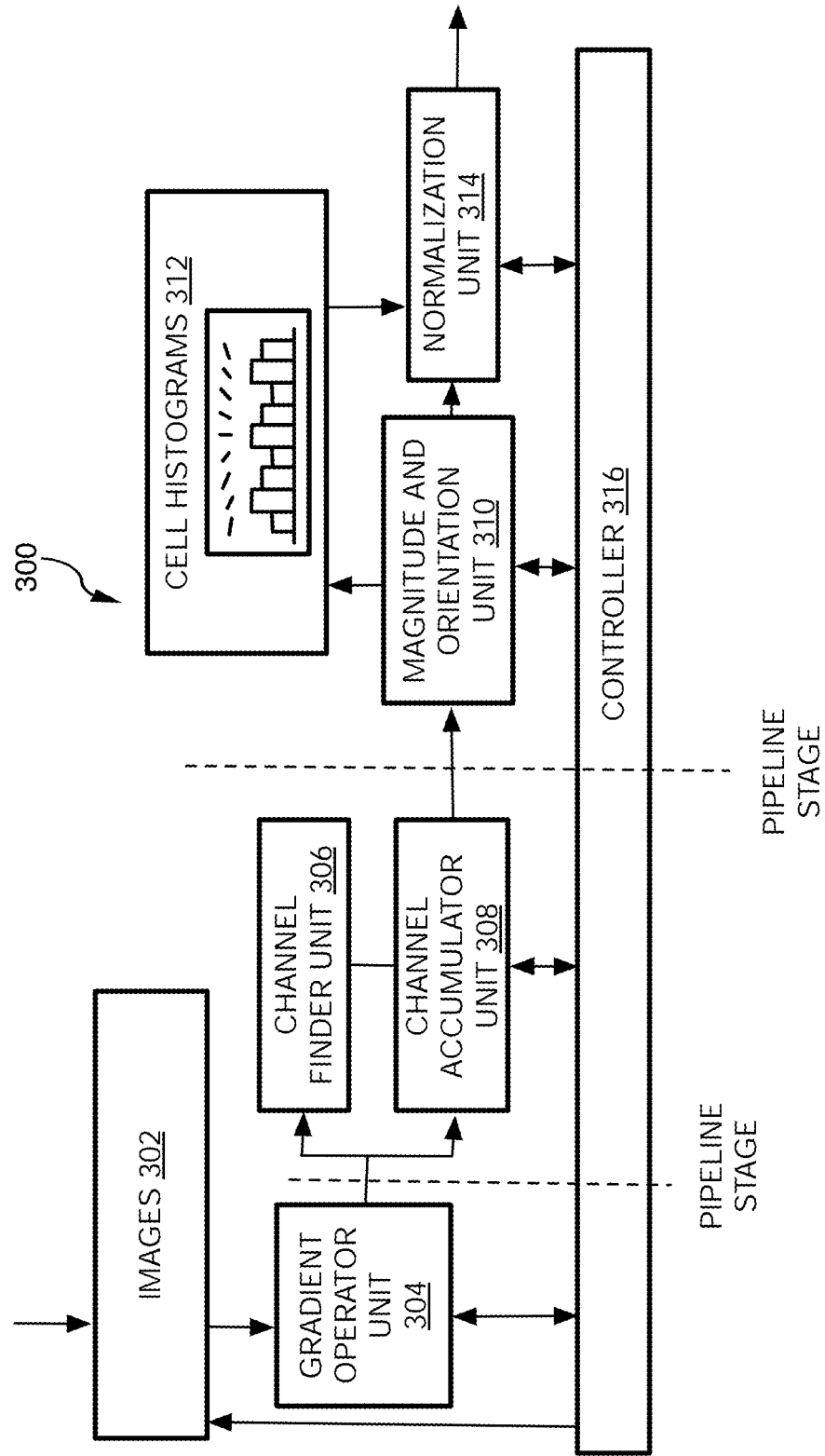

```
┌─────────────────────────────────────────────┐
│ OBTAIN IMAGE DATA COMPRISING HORIZONTAL AND │
│         VERTICAL GRADIENT COMPONENT         │
│  MAGNITUDES OF INDIVIDUAL PIXELS OF AN IMAGE│
│                     402                     │
└─────────────────────────────────────────────┘
                      ↓
┌─────────────────────────────────────────────┐
│ ASSOCIATE THE HORIZONTAL AND VERTICAL       │
│ GRADIENT COMPONENTS OF THE SAME PIXEL WITH  │
│             ONE OF A                        │
│        PLURALITY OF ANGULAR CHANNELS        │
│ DEPENDING ON THE VALUES OF THE HORIZONTAL   │
│       AND VERTICAL GRADIENT COMPONENTS      │
│                     404                     │
└─────────────────────────────────────────────┘
                      ↓
┌─────────────────────────────────────────────┐
│ DETERMINE A GRADIENT MAGNITUDE AND A GRADIENT│
│  ORIENTATION OF INDIVIDUAL ANGULAR CHANNELS │
│  AFTER THE HORIZONTAL AND VERTICAL GRADIENT │
│    COMPONENTS ARE ASSIGNED TO THE CHANNELS  │
│                     406                     │
└─────────────────────────────────────────────┘
                      ↓
┌─────────────────────────────────────────────┐
│ GENERATE A HISTOGRAM OF GRADIENTS BY USING  │
│ THE GRADIENT ORIENTATION AND GRADIENT       │
│ MAGNITUDE OF THE ANGULAR CHANNELS           │
│                     408                     │
└─────────────────────────────────────────────┘
```

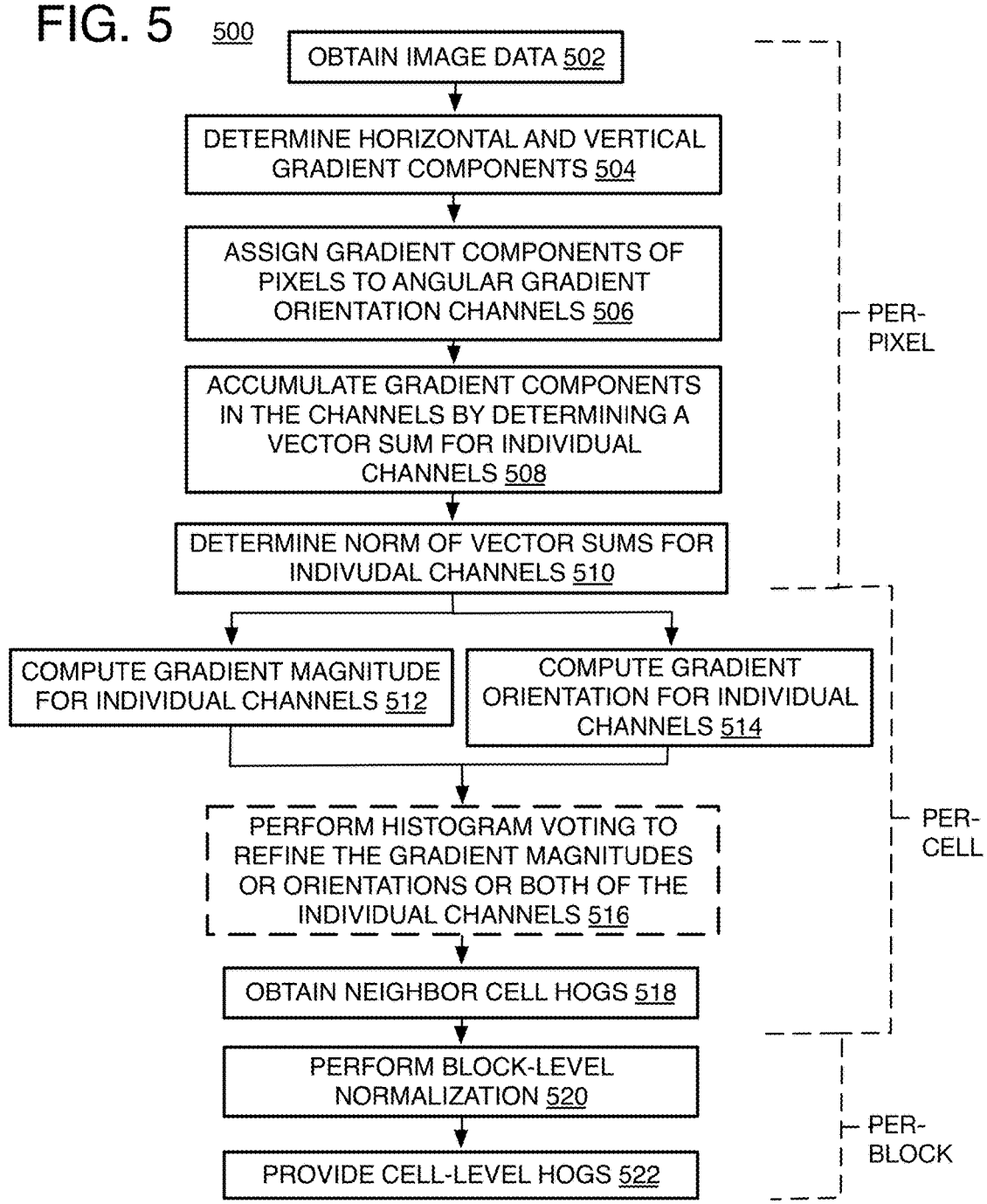

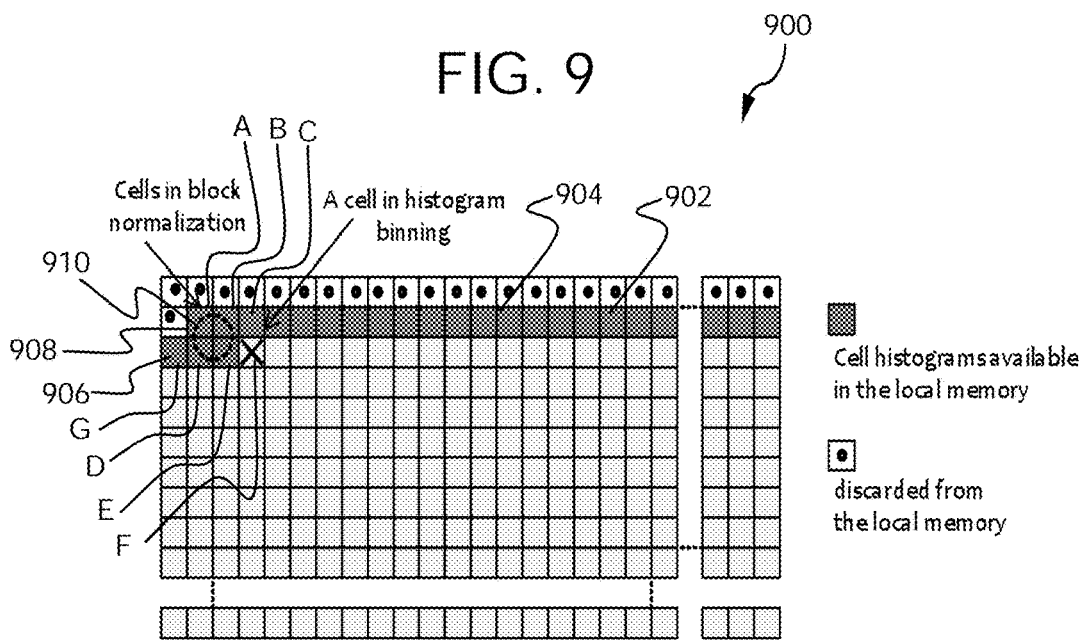
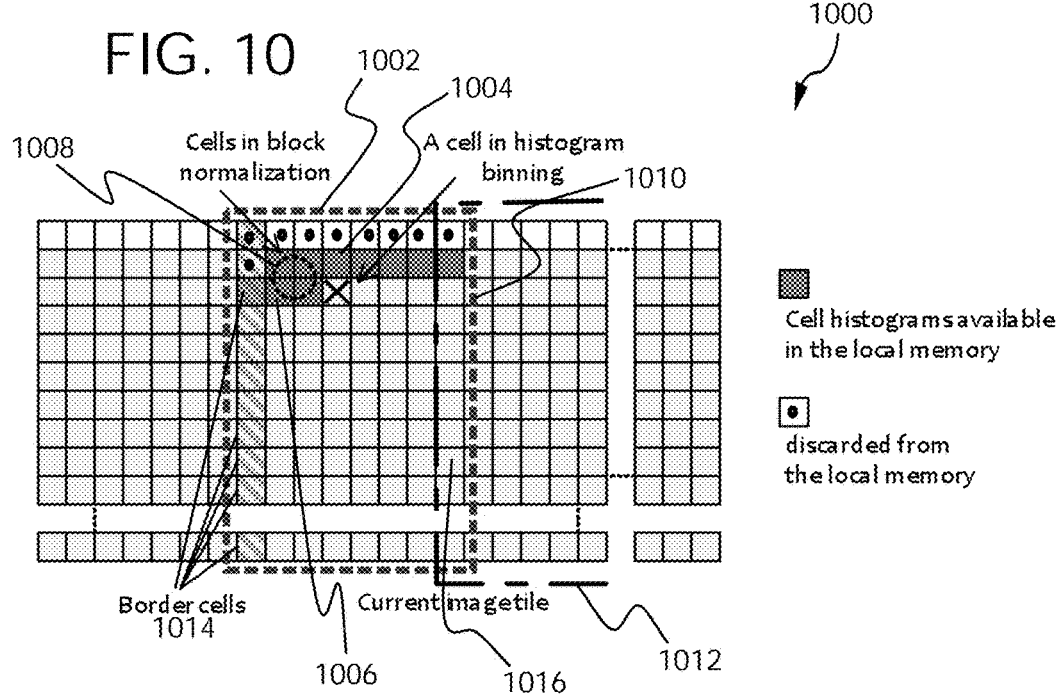

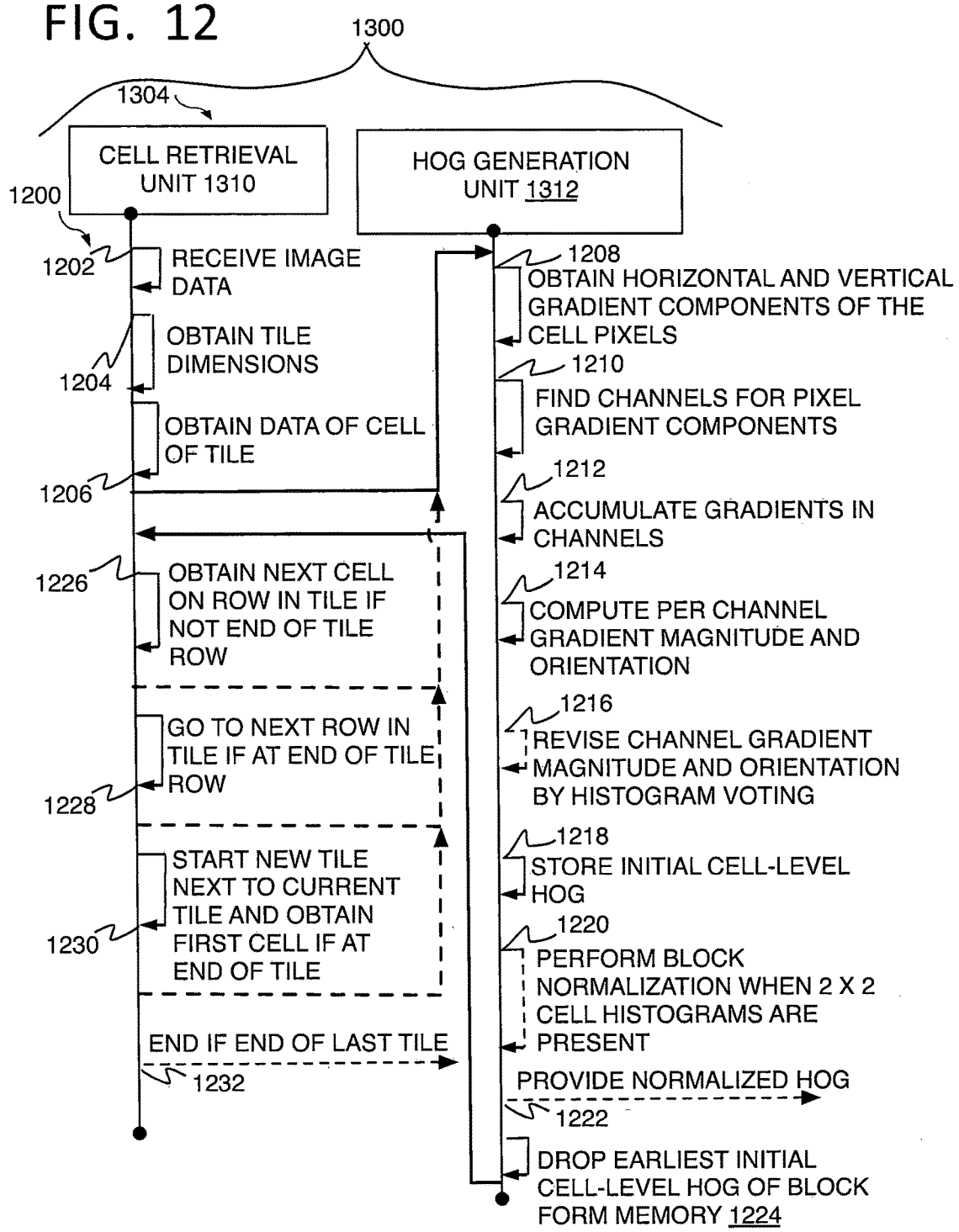

METHOD AND SYSTEM OF LOW-COMPLEXITY HISTROGRAM OF GRADIENTS GENERATION FOR IMAGE PROCESSING

BACKGROUND

Many electronic devices use computer vision to obtain, process, and understand the content in images captured by cameras or sensors usually to provide information to a user or make a decision depending on the content of the image. This involves using object detection, object, recognition, and/or feature extraction techniques so that a computer can identify objects in the image. One conventional technique is to use histograms of oriented gradients (HOGs) which map color and luminance gradients in an image to a number of histogram channels that are used to form a gradient distribution that forms the histogram. When certain gradient distributions are recognized in the image, this may indicate certain objects or edges of objects in the image. HOGs, however, often are formed by using a very high number of complicated computations and memory transactions resulting in a high power consumption that is difficult for high-end, high power electronic devices to maintain and makes it practically impossible for low-end or low-power devices to use (such as smartphones or wearable devices). This is especially true when power consuming features for forming the HOGs are desired such as an always-on mode.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 is a schematic diagram of an image processing device for generating histograms of gradients according to the implementations herein;

FIG. 4 is a flow chart of a method of generating histograms of gradients in accordance with the implementations herein;

FIG. 5 is a detailed flow chart of a method of generating histograms of gradients in accordance with the implementations herein;

FIG. 9 is a schematic diagram of an image being used to explain the order of row-wise cell-based HOG generation memory transactions;

FIG. 10 is a schematic diagram of an image being used to explain the order of tiled cell-based HOG generation memory transactions;

FIG. 12 is a diagram showing the operation of an imaging device performing histogram of gradient generation in accordance with the implementations herein;

DETAILED DESCRIPTION

Figure 1:
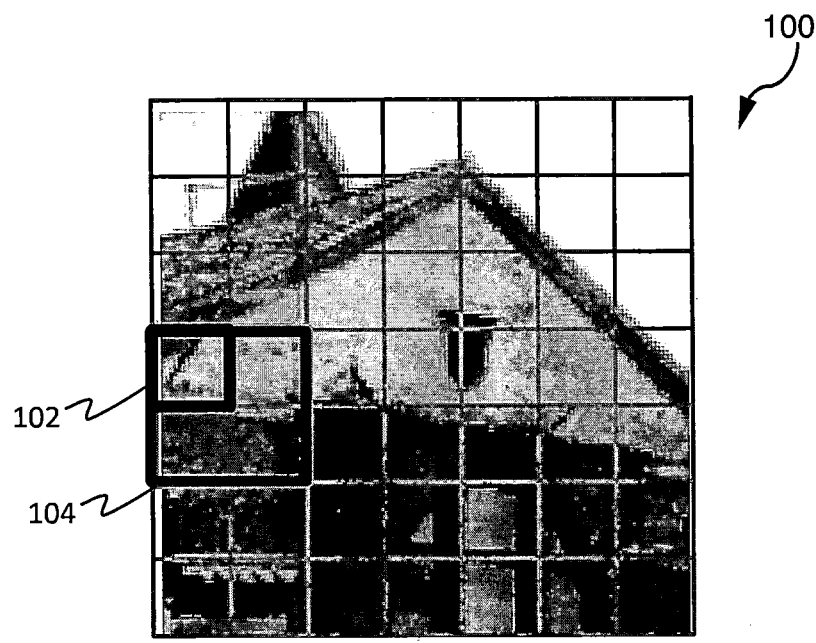
FIG. 1 is an example input image divided into cells for the HOG generation implementations herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets, wearables such as smart glasses, smart watches, exercise bands, headphones, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods to provide low-complexity histogram of gradients generation for image processing.

A typical front-end of computer vision applications is an object detection or feature extraction unit which retrieves a set of informative values from an image in order to facilitate subsequent learning and generalization operations depending on the objects detected and/or extracted from the content of an image. A histogram of oriented gradients (HOG) is a way to show a gradient distribution over a certain pixel area of an image and that is generated by assigning the gradients of the pixels to one of a number of histogram channels or bins that each indicate a range of gradient orientations. The gradient distribution of the HOG indicates how many of the pixels within the selected image area belong to each histogram channel. By one form, the HOGs are maintained on a per cell basis (such as a cell of an n×n square of pixels where n equals 8 by one example) so that a distribution of oriented gradients is generated for each cell. The final, normalized HOG, also referred to as a HOG descriptor in contrast to other types of descriptors of an image, has been a predominant feature descriptor for object detection and scene recognition. HOGs have been successfully employed in many computer vision pipes due to its high accuracy and precision with object discrimination. HOGs even have been known to be used to identify a visual object despite various appearance changes of the visual object.

Also, mobile and wearable platforms equipped with cameras have become prevalent in daily use, and the need to effectively recognize objects in the image content has increased sharply. Due to power limitations and the requirements of relatively large resolutions (such as 4K (3840× 2160 pixels)) inherent in these platforms, these devices require a highly efficient HOG processing framework. While HOG generation has become a standard for devices with high-quality features and a large power capacity, the high computational load of HOG generation often prevents the adoption of HOG generation for low power devices. HOG involves complex feature extraction operations that are not well suited for hardware acceleration typically used in the low end devices. Applications subject to low power consumption and/or low-cost devices may suffer from HOG's intricate computations and high memory transactions. As the image resolution and frame rate increase, even highly sophisticated hardware accelerators have difficulty affording the power envelope to effectively generate HOGs.

More particularly, the conventional HOG generation contains many sophisticated operations that help capture a wide spectrum of the appearance variance of a visual object when constructing a training-based object detection model. Generally, this includes hardware-expensive operations such as the arctangent and bilinear interpolation in the histogram binning as well as the division and square root norm in the contrast normalization. Specifically, one specific disadvantage of HOG generation that causes the power drain is the per-pixel computations that use square root operations to determine a gradient magnitude of a pixel from gradient x and y component values, and an arctan operation used to determine the orientation of the gradient at the pixel. The square root and arctan operations involve an iterative process that can include many operations to determine a single value. At least these two operations apply a heavy computational load when applied to the thousands of pixels of a screen such that the operations cannot be efficiently performed by a low-power device. The result is often a bottleneck with very slow processing that is observable by a user. This is especially true when feature extraction is in always-on mode.

To resolve these issues, from experimentation, it was determined that the level of sophistication of the HOG algorithm can be adjusted depending on target applications. While a trade-off should exist between HOG's detection performance and algorithm simplification, for the applications relevant to scene classification or scene saliency in which HOG is used as a global scene descriptor, it was observed that the performance degradation of HOG was not significant even while lowering the complexity of the algorithm as that used herein.

Thus, simplifications were, made or may be made that eliminate non-hardware-friendly operations and achieve low-complexity while maintaining discriminative power as a global scene descriptor including (1) omitting the bilinear voting for neighboring channels in the histogram binning when hardware costs and system efficiency are a larger concern than accuracy, (2) omitting the arctangent computation in the histogram binning, (3) using the absolute norm (L1) of a vector sum of gradients in the histogram voting if histogram voting is performed at all, and/or (4) using the maximum norm (L∞) in the contrast normalization, among other possible strategies explained herein.

The hardware-optimized algorithm avoids the bilinear operation involving a precise angle calculation but implements a coarser-level channel finder which requires no arctangent operation. The contrast normalization is performed by finding a maximum value among all the neighboring cell histograms in a 2×2 cell block. These simplifications decrease the required chip area and functional units, which can also decrease power consumption significantly.

Thus, an efficient low-complexity HOG generation method and system herein provides faster processing and lower computational loads and low-complexity so that the method results in low power consumption and may be applied by low-power devices. The method and system, however, does not result in a significant reduction in performance, and is capable of producing a comparably accurate and precise HOG as that produced in conventional HOG generation. This efficiency enables operation of the HOG generation on low cost hardware architecture, and is more compatible with hardware acceleration.

To accomplish this, the HOG generation herein performs gradient magnitude and orientation computations differently, or in a different order, than the conventional methodology. Particularly, the HOG here is an image feature that has local 1-D histograms of gradient directions while an image is partitioned into small rectangular regions such as cells so that each cell has a gradient distribution. Normally, the gradient magnitude and gradient orientation are computed on a per-pixel basis by using the Pythagorean theorem (square root operation) and arctan (which requires division) by using gradient x and y components of each pixel, and resulting in the heavy computational load. This is avoided here by forming a number of angular gradient orientation channels (or bins or intervals) before the gradient magnitude and orientation are determined for the pixels. Then, each pixel is associated with one of the channels based on the pixel's gradient x and y components. This bin selection or binning process for the pixels is accomplished by using a very low-complex algorithm that uses multiplication of a tangent operation and a simple comparison of numbers (such as at a channel boundary condition explained below) that differentiate the available channels. Thereafter, the gradient magnitude and orientation is calculated for each channel rather than for each pixel. These calculations are performed by using simple vector sum algorithms using the gradient components from the pixels assigned to the channel. After a histogram voting operation that refines the gradient values for each channel, if not omitted, normalization is applied that further refines the values considering the gradient channel values of the neighboring cells. The final cell level histograms each have a gradient distribution based on the gradient values of the channels. This is explained in greater detail below.

This arrangement increases the speed of the HOG generation so that hardware or software resources can be used to perform other tasks during image processing or feature extraction. This result is achieved because a simple channel finder does not use the computationally heavy, multi-step iterative square root and arctan operations, and the one-step multiplication and comparison operations of the channel finder can be performed much faster and/or performed on smaller capacity harder rather than fixed function logic. This is performed using an algorithm with low complexity even though the channel finder structure still considers both the x-gradient and the y-gradient to estimate the proper single gradient orientation channel allocation rather than a more complex system that may result in separate x-gradient and y-gradient histograms.

This arrangement provides an extremely large reduction in computational load and permits the HOG generation herein to achieve optimal computational complexity and performance for high-quality vision applications such as video summarization without significant reduction in image quality. This also enables efficient HOG generation on system-on-chip (SOC) products including wearable and other power constrained platforms.

To further increase the efficiency and speed of the HOG generation, an efficient image scanning and memory transaction method is tailored to the HOG algorithm which can enable the use of a lower-cost smaller memory. This is achieved by dividing an image into tiles, and then processing cells within the tile in a tile-by-tile manner to reduce the number of cells needed to be held in memory at one time in order to perform block-based normalization. This requires re-calculation of the gradient histograms of some of the cells, but the amount of recalculation can be controlled to minimize the memory size despite the recalculation. This operation is explained in detail below.

Referring now to FIG. 1, an image, or part of an image, 100 is provided and is divided into cells 102. As mentioned, a cell-level HOG (or just cell HOG) that provides an oriented gradient distribution may be formed for multiple individual cells or each cell of the image. It will be understood that while the present HOG generation uses cells of 8×8 pixels, cells of other sizes could be used. A block 104 may hold a number of cells, and in the present example, 2×2 cells, and that may be used for block-based normalization of the channel gradient magnitudes as explained below. The block also may hold a different number of cells than that provided for the example here.

Figure 2:
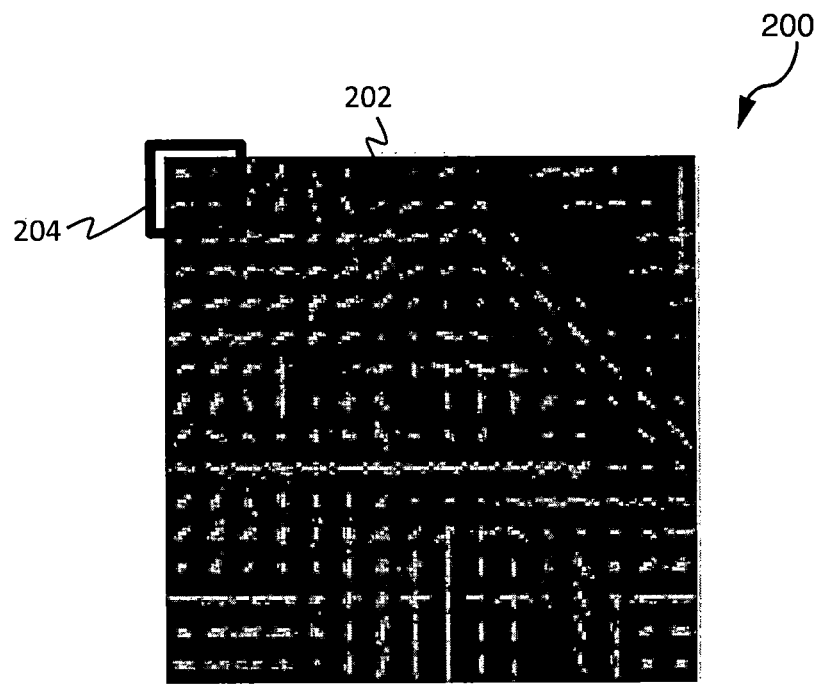
FIG. 2 is an example image-level HOG produced by using the HOG generation implementations herein.

Referring to FIG. 2, a resulting HOG image (or part of the image) 200 is provided and illustrates the gradient orientation distributions 202 for the cells 204. This may be either for color (contrast) or brightness (luminance). The gradient orientation lines run perpendicular to the gradient or change in color or luminance. It will be understood that the term HOG may refer to a cell-level HOG or an entire image or frame where each cell has its own gradient distribution (or cell-level HOG) depending on the context.

Referring to FIG. 3, an image processing system 300 for HOG generation (also referred to as a HOG accelerator) is provided to perform the HOG generation implementations described herein. The system 300 has a cell-based pipeline stage (as shown by the dashed lines).

The system 300 may include input images 302 in the form of image data or pixel data that has luminance and/or chroma values of the pixels of the image. The image data may be obtained from volatile or non-volatile memory as described herein. A gradient operator 304 uses the pixels values to calculate horizontal and vertical gradient components for each pixel, and may be performed using centered [−1 0 1] filter kernels as explained below. The gradient components are then provided to a channel finder 306 that assigns the pixel (or more precisely the pixel's gradient components) to one of a set of pre-defined angular gradient orientation channels (or intervals or bins). By one example, there may be nine channels each covering 20 degrees to cover a non-sign sensitive total of 180 degrees. The binning of the pixel's gradient components is determined, by one example, by comparing a hypothetical gradient component at a boundary of the channels to the actual gradient component value of the pixel rather than using computationally heavy arctan operations.

A channel accumulator 308 then uses all of the gradient components of the pixels of a single channel to form a vector sum for the channel, resulting in a vector sum with a total x-gradient and a total y-gradient for each channel. By one example form, this also may include determining the L1 norm for each of the nine vector sums before further processing of the normalized vector sum. Then, a magnitude and orientation unit 310 calculates a single gradient magnitude and single gradient orientation for individual channels or each channel using the vector sums. This is performed by using the Pythagorean Theorem to determine the gradient magnitude and using arctan to determine the gradient orientation for each channel rather than for each pixel of a cell. The magnitude and orientation unit 310 also may perform histogram voting. This includes modification of the channel gradient magnitude and orientation values by considering the channel gradient magnitude and orientation values of nearby cells relative to a current cell being analyzed. To refine the gradient value of each channel during histogram voting, optionally, bilinear interpolation using the relative x and y distance from a pixel in a block (such as 2×2 cells) to a common relative spatial location in the block is used to calculate the interpolated gradient magnitude and orientation value for the pixel. It should be noted, however, that bilinear interpolation, and even histogram voting entirely, may be omitted when hardware costs and system efficiency are greater than the need for accuracy. This is performed for each pixel in the block, and the histogram is recreated from the interpolated values. This results in an intermediate cell-level HOG 312 where each channel has a gradient magnitude and orientation. The intermediate cell HOGs 312 then may be stored in a local memory, such as RAM, but could be other volatile or non-volatile memory to keep the intermediate cell histogram values.

The cell HOGs may be stored according to a memory transaction process so that a normalization unit 314 can perform normalization on a block basis (with 2×2 cells by one example), and that uses $L_\infty$ normalization as explained in detail below. Thereafter, the resulting HOG image or HOG descriptor (FIG. 2) formed of cell-level HOGs is ready for use by an object detection or feature extraction application. A controller 316 may fetch a cell from the input image for the Hog generation and control the operation of the other units mentioned above. The channel finder unit 306 and channel accumulator unit 308 may operate in a pipeline stage to increase speed of the processing as shown, but forming a defined pipeline for these operations also may be omitted.

Referring to FIG. 4, a process 400 is provided for a method of low-complexity histogram of gradients generation for image processing. In the illustrated implementation, process 400 may include one or more operations, functions or actions 402 to 408 numbered evenly. By way of non-limiting example, process 400 may be described herein with reference to example image processing system 300 or 1300 of FIG. 3 or 13 respectively, and where relevant.

The process 400 may include "obtain image data comprising horizontal and vertical gradient component magnitudes of individual pixels of an image" 402. As explained in detail below, this may include using captured image data that has at least been pre-processed so that the data is ready for object detection or feature extraction. The calculation of the horizontal and vertical gradient components for a current pixel may include the use of 1-D centered filter kernels that respectively derive the horizontal and vertical gradient components from the adjacent (or neighbor) right and left pixels and the adjacent above and below pixels relative to the current pixel. Other known pixel patterns and ways to calculate the horizontal and vertical gradient components may be used as well. The resulting horizontal and vertical gradient components for each pixel than may be used to calculate a gradient magnitude and a gradient orientation for each pixel and as described herein.

The process 400 may include "associate the horizontal and vertical gradient components of the same pixel with one of a plurality of angular channels depending on the values of the horizontal and vertical gradient components" 404. This may include a preliminary operation of dividing the range of all possible angular orientations (or in other words, 360 degrees) into channels (or intervals or bins). By one form, the channels are non-sign sensitive such that the channels need only cover 180 degrees by ignoring positive and negative directions of the orientations. By one example form, nine channels are provided each covering about 20 degrees. Then during processing, a channel may be found for each pixel (or in other words, the gradient components of the pixel may be assigned to a channel) by a simple computation that finds a representation for each channel and compares the horizontal and/or vertical gradient components of the pixels to the representations without first using the computationally heavy arctan operation to determine the gradient orientation of the pixel. By one example, this is accomplished by comparing a hypothetical gradient component at the boundaries of the channels to the actual gradient components to determine whether that gradient component, and in turn its pixel, should belong to that channel. Thus, a range of hypothetical gradient components may be formed for individual channels, and the gradient components, and in turn their pixels, are accordingly assigned to the correct channels. This may be performed for all pixels in an area to be covered by a histogram, such as a cell, block, or other area (or could even be the entire image). A cell (8×8 pixels) is used for the example area herein.

The process 400 may include "determine a gradient magnitude and a gradient orientation of individual angular channels after the horizontal and vertical gradient components are assigned to the channels" 406. Particularly, once the channel for each pixel is found, all of the gradient component values assigned to a channel are used to find a vector sum (a total horizontal gradient component and a total vertical gradient component) for the channel. The vector sum is then used to calculate the gradient magnitude and gradient orientation for the channel.

The process 400 may include "generate a histogram of gradients by using the gradient direction and gradient magnitude of the angular channels" 408. This may include operations to refine the gradient magnitude and gradient orientation for the channels such as by a histogram voting operation that includes bilinear interpolation. The bilinear interpolation, and even histogram voting altogether, may be omitted, however, when hardware costs and system efficiency are a greater concern than accuracy. The refinement of the gradient values also may include multiple cell (or block-based) normalization. The normalization may use $L_\infty$ overlapping normalization with blocks of 2×2 cells. Thereafter, a gradient distribution (or HOG) may be formed for each cell by using the gradient magnitudes and orientations of the channels, and an entire image of the cell-level HOGs may be collected to form a single image-level HOG.

The normalization mentioned also may include an efficient memory transaction process to reduce the memory size, and in turn hardware requirements. This may be accomplished by using a tile that has a width that is less than an entire width of an image so that only those cells within the tile are maintained in memory rather than cells to the edge of the image as cells are processed row-by-row in raster fashion within the tile. The tile of cells is processed in raster fashion down the image to maintain a block of 2×2 cells in memory for the normalization processing. Whichever cells fall outside of the tile are dropped from memory. This results in the need to re-calculate gradients for normalization of some of the cells from a tile that is completed and for the next adjacent tile to be started. The width of the tile is determined so that the number of cells with re-calculated gradients is set so that the tile is still more efficient than holding all cells in memory that will be needed to perform the normalization. It has been determined, however, that a tile size can be set that still substantially reduces the required memory size. Tile size should be a multiple of the cell size. For example, the tiles may have a width of about 160, 168, or 152 pixels for cell that have a width of 8 pixels. By one form, tiles with a 160 pixel width (or 20 cell width) is used. By another form, asymptotically some multiple of 8 pixels in the range from about 20 to about 60 could be good to use (or in other words, 16, 24 . . . to 56). By another form, the minimum size of the tile width may be two cell widths while the maximum size of a tile width is only limited by being less than the screen width. The details are explained further below.

Referring to FIG. 5, a process 500 is provided for a method of low-complexity histogram of gradients generation for image processing. In the illustrated implementation, process 500 may include one or more operations, functions or actions 502 to 524 numbered evenly. By way of non-limiting example, process 500 may be described herein with reference to example image capture processing system 300 or 1300 of FIG. 3 or 13 respectively, and where relevant.

Process 500 may include "obtain image data" 502, and particularly, pixel data of one or more input images including the RGB color values and/or the luminance values of the pixels by one example. The input image data may already have been pre-processed including demosaicing, noise reduction, pixel linearization, shading compensation, resolution reduction, vignette elimination, and/or 3A related operations including automatic white balance (AWB), automatic focus (AF), and/or automatic exposure (AE) modifications any of which may refine the luminance and/or color values of the pixels when the device is a camera that captured the images.

By one form, this also includes obtaining a cell (n×n pixels, and by one example where n equals 8) of the input image so that the HOG processing proceeds by fetching pixels a cell at a time. It should be noted that process 500 (FIG. 5) shows that the initial operations are performed on a per pixel basis because the computations are still performed on individual pixels as follows.

Process 500 may include "determine horizontal and vertical gradient components" 504. By one form, this includes computation of the gradient component values in the horizontal x and vertical y directions for individual pixels. This may be performed by the gradient operator 304 or 1314. One common method to compute horizontal and vertical gradients is to apply the one-dimensional (1-D) centered derivative mask in both the horizontal and vertical directions. Specifically, this method requires filtering the color or intensity data of the image with the following filter kernels: $[-1, 0, 1]$ and $[-1, 0, 1]^T$ where T is transpose to indicate a vertical filter vector forming a small cross or plus pattern. Thus, this includes using the difference of the adjacent neighbor right and left pixels relative to a center current pixel to determine the horizontal x-gradient component, and the adjacent neighbor above and below pixels relative to the current pixel to determine the vertical y-gradient component.

Again, this may be performed cell by cell as the HOG generation is being performed and as explained in detail below regarding the memory transaction process that can be used with HOG generation. Alternatively, the gradient component computations could be performed for a certain portion of an image (such as a row or larger window) or even could be performed for an entire image especially when a map of horizontal and vertical gradient components is desired for certain applications.

Process 500 may include "assign gradient components of pixels to angular gradient orientation channels" 506. A channel finder may be provided that associates each gradient component, and in turn a pixel, with a corresponding histogram angular gradient orientation channel (simply referred to herein as a channel, bin, or interval). Specifically, one goal of the HOG generation is to establish a 1-D cell orientation histogram generated from all the image gradient components within the cell or (n×n) region and placed in channels that can accurately represent the gradient orientation distribution in sufficient detail to be useful. The histogram channels may be evenly spread over 0 to 180 degrees while the sign of a gradient direction is ignored. Due to the use of the tangent function, opposite angles (such as 45 degrees and 225 degrees) on a (positive) 360 degree range will be placed in the same bin. It has been found that nine channels each with an angle of about 20 degrees (such as that shown in FIG. 6) provides sufficiently accurate histograms that result in high performance. Each pixel within the cell contributes a weighted vote for the histogram channels based on its gradient magnitude as explained below.

Also as already mentioned above, the presently disclosed HOG generation method limits or eliminates the computationally heavy and time consuming per-pixel operations in order to perform the binning into the channels in the conventional method. In the conventional method, this included computationally expensive functions such as the squared or square root operation of gradient values for the gradient magnitude and arc-tangent operation for the gradient orientation both used for the binning, and optionally bilinear operation for splitting the vote with neighboring bins. Instead, the HOG generation method here converts these computations to operations per histogram channel rather than per pixel. For example, x64 operations (equal to $n^2$) can be reduced to x9 operations (equal to m), in the case when the cell size n=8 and the number of histogram channels m=9 as in the present example. The gain is increased as the cell size is increased where m is much less than $n^2$ as n grows. While a histogram channel finder, such as channel finder 306 or 1316, is used that operates on a per-pixel basis to place or bin the gradient components of each pixel of a cell in a channel, the channel finder uses a simple comparison technique without using the square root and arctan operations per pixel. After the gradients are assigned to the channels, then the square root and arctan operations may be used to calculate the gradient magnitude and orientation on a per-channel (and per-cell) basis, which is used a mere nine times for nine channels.

Figure 6:
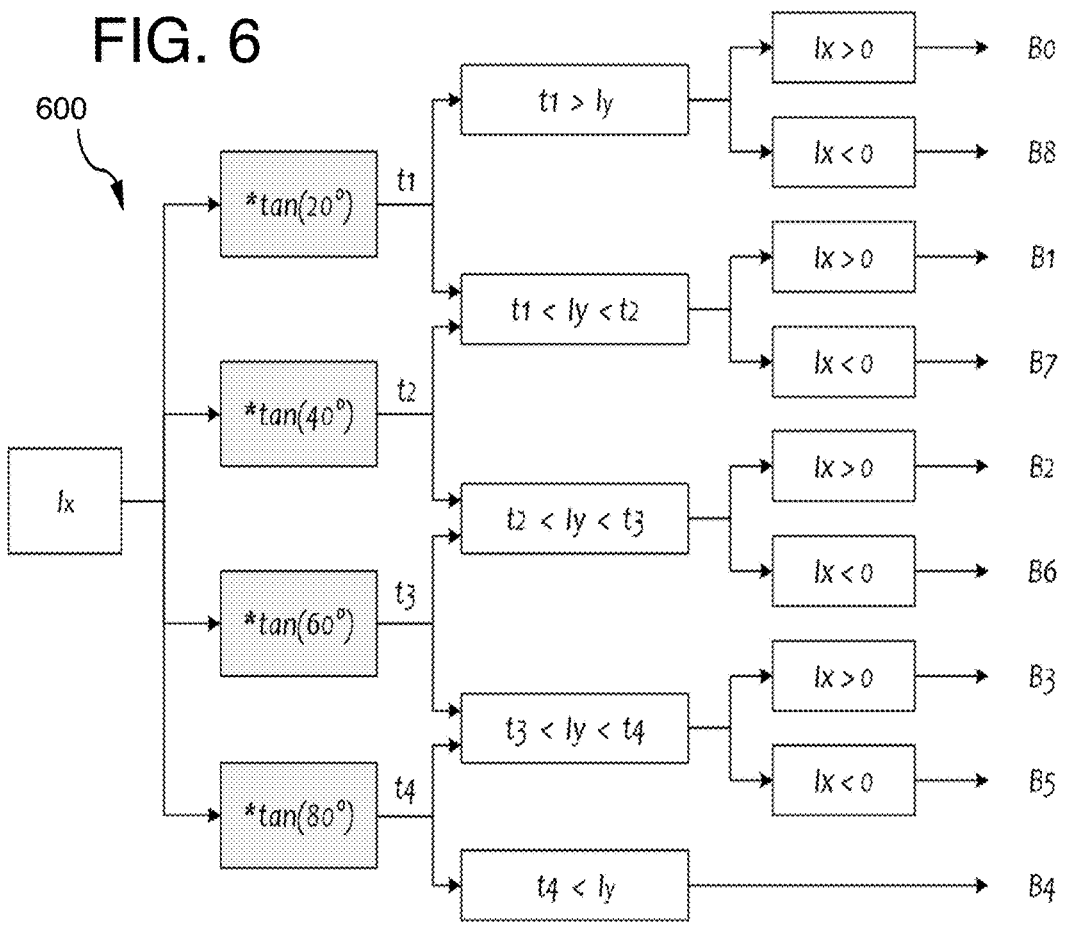
FIG. 6 is a schematic diagram of a channel finder for the method of generating histograms of gradients.
Figure 7:
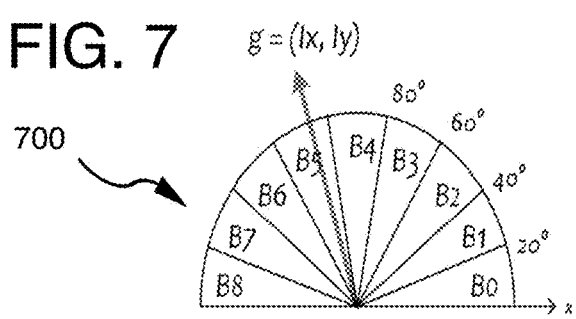
FIG. 7 is a schematic diagram of channels used by the channel finder.

Referring to FIGS. 6-7, by one example, a channel finding process or algorithm 600 forms a representation of each channel and compares the value of the x-gradient or y-gradient or both to the representation(s) to determine whether the gradient components of a pixel belong in that channel. More specifically, the channel finding process uses hypothetical gradient components at the boundaries of the channels to determine which channel a gradient component should belong to. For process 600, a non-sign sensitive gradient orientation range 700 is established with the nine angular gradient orientation channels $B_0$ to $B_8$ where channel $B_0$ covers gradient orientations from approximately 0 to 20 degrees, $B_1$ covers gradient orientations from approximately 20 to 40 degrees, and so forth up to $B_8$ that covers the gradient orientation range from 160 to 180 degrees.

A channel boundary condition may be written as equation (1) below and multiplied by $I_x$ in equation (2). These equations indicate that the channel finding can be implemented by a series of comparisons of a pixel's y-gradient $I_y$ with a product of the pixel's x-gradient $I_x$ and tangent values of the channel's border orientation $\theta_i$ for i=9 channels (and which forms a hypothetical $I_y$ value at the channel boundary).

$$\theta_i \leq \tan^{-1}\left(\frac{I_y}{I_x}\right) \leq \theta_{i+1} \qquad (1)$$

$$I_x \tan\theta_i \leq I_y \leq I_x \tan\theta_{i+1} \qquad (2)$$

where equation (2) indicates how equation (1) can be implemented using fewer operations without division (to avoid greater computational hardware capacity), and when the cell histogram uses nine channels with a 20 degree resolution and no orientation sign. Note that the following symmetric property of tangent is employed to achieve even greater efficiency:

$$\tan\theta = -\tan(180°-\theta), \theta=[0,180°) \qquad (3)$$

This symmetry can decrease the number of multiplications and memory requirements when saving the boundary tangent values.

Applying the equations for example, the decision process for a given pixel gradient g=($I_x$, $I_y$), which actually lies in the channel $B_5$ (FIG. 7), would be as follows. First, a hypothetical vertical gradient component (also referred to as the hypothetical y-gradient or tangent or channel boundary representation) $t_1, \ldots, t_4$ are computed for the channel boundaries. The tangents $t_1$ to $t_4$ are generated by multiplying tangents at four boundaries 20, 40, 60, and 80 degrees respectively by the x-gradient $I_x$:

$$I_x \times \tan(\alpha) = t_\alpha \tag{4}$$

where α is the angle at the boundary α. This results in four tangents or hypothetical y-gradient values at a boundary of the channel and ready for the subsequent five possible comparisons with respect to $I_y$ as follows. As shown on FIG. 6, when $I_y$ is less than $t_1$, then either channel $B_0$ or $B_8$ is indicated depending on whether $I_x$ is less than or greater than 0 (whether $I_x$ is negative). When $I_y$ is greater than $t_1$ but less than $t_2$, then either channel $B_1$ or $B_7$ is indicated depending on whether $I_x$ is less than or greater than 0. When $I_y$ is greater than $t_2$ but less than $t_3$, then either channel $B_2$ or $B_6$ is indicated depending on whether $I_x$ is less than or greater than 0. When $I_y$ is greater than $t_3$ but less than $t_4$, then either channel $B_3$ or $B_5$ is indicated depending on whether $I_x$ is less than or greater than 0. Lastly, when $I_y$ is greater than $t_4$, then channel $B_4$ is indicated for those gradients.

The sign of the x-gradient is considered because a negative x-gradient $I_x$ indicates the gradient orientation is in the second Cartesian quadrant. Thus, when only $t_3 < I_y < t_4$ is satisfied, and the decision remains between $B_3$ and $B_5$, a negative sign of $I_x$ indicates the second quadrant and, therefore, $B_5$ is finally selected.

It will be understood that this simple binning process may apply to systems with more or less channels than nine. Also, other representations for a channel could be used such as determining some threshold from a value of the hypothetical y-gradient at the center angle of a channel. For another example, sequential comparisons of the y-gradient values to each other may be used for binning purposes. This latter technique, however, may include higher costs in the number of operations and the number of multiplications for the comparisons compared to that of the proposed parallelized method. Many other examples are possible but may or may not be as efficient or precise as the present example of channel finder process 600.

Figure 8:
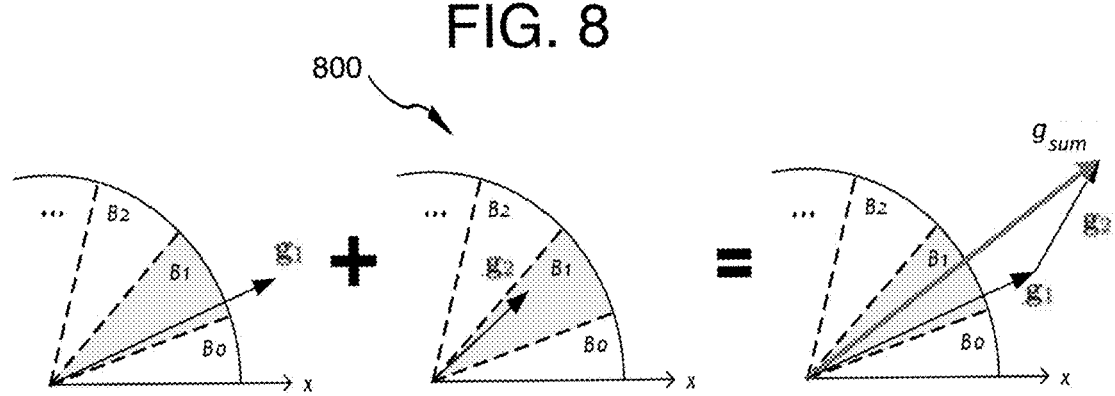
FIG. 8 is a schematic diagram to show gradient accumulation in the channels.

Referring to FIG. 8, process 500 may include "accumulate gradient components in the channels by determining a vector sum for individual channels" 508. Once the gradients are assigned to a channel and the bin finding process is complete, at least for a current cell, the channel accumulator adds the gradients of the same channel and produces a vector sum. For example, assume two gradients $g_1$ and $g_2$ each have x-gradient and y-gradient ($I_x$, $I_y$) components and are of the same cell and extend in the same channel $B_1$. A vector sum is found by:

$$g_{sum} = g_1 + g_2 \tag{5}$$

and more particularly, $$g_{Bi} = \sum g_k = \sum (I_{x,k}, I_{y,k})^T \text{ for } i = 1, \ldots, 9 \tag{6}$$

where i is the number of channels and ($I_{x,k}$, $I_{y,k}$) are the horizontal and vertical gradient components for each pixel k of a cell and assigned to the same channel $B_i$, and where $g_{Bi}$ is the vector sum $g_{sum}$ for each channel i. The resulting vector sum for each channel $B_i$ is:

$$g_{Bi} = (I_{x,Bi}, I_{y,Bi}) \tag{7}$$

and specifically by adding all of the x-gradient components together, and separately adding all of the y-gradient components together in the channel resulting in $g_{sum}$ as shown on FIG. 8 or $g_{Bi}$ to respectively form a total channel x-gradient $I_{x,Bi}$, and a total channel y-gradient $I_{y,Bi}$ for each channel.

Process 500 may include "determine norm of vector sum for individual channels" 510. The magnitude calculator also may compute an absolute distance of the vector sum (L1 norm). L1 norm may be defined as the summation of abs value of gradient values for the vector sum. In equation form, this may include the L1 norm equation:

$$\|g_{sum}\| = \sum_{r=1}^{n} |X_r| \tag{8}$$

where r=1 . . . n gradient components in one direction (either x-gradient or y-gradient separately) and $X_r$ is the gradient value for a single vector sum for a single channel. Thus, the summation (equation (8)) is performed separately for the x-gradients and the y-gradients, and separately for each channel. The values for all of the pixels in a cell and for the nine channels are saved in the local memory as a non-normalized, intermediate or initial cell histogram for future use. Then, the remaining histogram binning operations are performed on only the single vector $g_{sum}$ instead of all the individual gradients $g_1$ and $g_2$.

After the bin finding process and accumulation of the gradients in the channels to generate a normalized vector sum for each channel, simultaneous operation of (1) the multiplication and comparisons of gradient values at the channel finder for one cell and (2) accumulation of gradients in the accumulator for another cell may form a significant time saving path for pipeline stages increasing pipeline speed capacity at a hardware accelerator for example.

Particularly, process 500 may include "compute gradient magnitude for individual channels" 512. This is accomplished by using the total channel x-gradient and y-gradient values of the vector sum for the channel in the Pythagorean Theorem as follows (and is now considered a per cell and/or per channel operation).

$$g_{mag} = I_{x,Bi}^2 + I_{y,Bi}^2 \tag{9}$$

This results in nine gradient magnitude values $g_{mag}$ per channel and per cell in the present example where m=9.

Process 500 may include "compute gradient orientation for individual channels" 514. Now the arctan in the gradient orientation is performed but only once per channel and per cell from the vector sum as follows.

$$g_{or} = \tan^{-1}(I_{y,Bi}/I_{x,Bi}) \tag{10}$$

The gradient magnitude and gradient orientation computations may be performed simultaneously by a hardware accelerator.

Process 500 may include "perform histogram voting to refine the gradient magnitudes or gradient orientations or both of the individual channels" 516. This operation may be optional and may include performing bilinear interpolation on a cell by cell basis and on the gradients of the channels of each of the cells. This may be used when accuracy is more of a concern than the hardware costs and system efficiency. In more detail, a cell pattern is selected such as a 2×2 block of cells (similar to the block used for normalization explained below) so that the gradient magnitude and orientation of a channel are modified based at least in part on neighboring cells in order to limit aliasing. The pattern may be determined for each 2×2 block of cells for an image and may or may not be overlapping with each possible foursome of cells in an image. The bilinear interpolation proceeds as follows.

To perform the bilinear interpolation, a relative spatial location is found, such as the center point of a block of cells, which may be 2×2 cells or other arrangement of cells. Based on the calculated spatial distance per direction (x and y), a weighted contribution for a bin is calculated for neighboring cells. Finally, an interpolated value will be determined for a gradient magnitude and angle values. In general, a higher weighing factor is assigned for a closer cell and vice versa. Specifically, to perform the bilinear interpolation, the following equation form is used:

$$y = (1-u)*(1-v)*x \tag{11}$$

where y is the interpolated value for an individual pixel, u and v are y-axis and x-axis relative distances between a pixel and cell origins (or in other words, the relative spatial location mentioned above) in a block of 2×2 cells, respectively, and x is the gradient magnitude of a pixel (where the pixel is assigned the gradient magnitude of the channel the pixel was assigned to). The equation also may be repeated for the angle values as well. The range of u and v is [0 1). This is performed for each pixel in the block of four cells, and the histogram for each cell is then recreated based on the interpolation values for each pixel. The result in an initial histogram of gradients for the individual cells. It will be understood that for better efficiency the (u and v) relative distances may be calculated during the per pixel portion of the process 500 such as near or while the vector sums are being computed during operation 508. Then, when the interpolated values are formed and ready for histogram voting later, the relative distances are already created to be plugged into equation (11) above as needed.

Process 500 may include "obtain neighbor cell HOGs" 518, and particularly, obtain the initial cell-level HOGs stored in temporary or other memory to form a 2×2 block of cells. The initial cell-level HOGs may be generated and stored in a row-by-row raster manner so that the stored cell histograms form an overlap between an upper row and lower row of cells on the image to form a 2×2 block of the cells for normalization. By one example, the initial cell HOGs are obtained in raster fashion for a tile that has a smaller width then an entire row of the image in order to reduce the amount of memory used to hold the initial cell HOGs for normalization. The cells in the tile are then normalized before moving on to another tile. The order of memory transactions to provide this further memory reduction is explained in greater detail below with the memory transaction process for the HOG generation.

Process 500 may include "perform block-level normalization" 520, and particularly by using the maximum norm ($L_\infty$) in the block-based contrast normalization. The normalization is performed by finding a maximum value among all the neighboring cell histograms in the 2×2 cell block. When the controller detects that all the 2×2 cell histograms of a block are ready, each cell histogram in the block may be normalized by the maximum value of the block ($L_\infty$).

The normalization suppresses the sensitivity of HOG to illumination and contrast changes. Normalizing gradient strengths over spatially connected blocks is important to attenuate a variance in local appearance modeling. When the four cell histograms of a block are obtained, the normalization operation includes dividing the four histograms by the maximum norm by using a multiplication from a division look-up table. The division is implemented by approximating a reciprocal of the number by a piecewise linear interpolation. $L_\infty$ is the max value among all absolute values of the contrast normalization factors. As an equation:

$$|x|_{inf} = \max|x_i| \tag{12}$$

$$g_{final} = \frac{g_{sum}}{|x|_{inf}} \tag{13}$$

where here $x_i$ is the gradient value at one of the bins or channels, i=1 to n cells of the four cells in the block, and $x_{inf}$ are the contrast normalization factors or in other words, the gradient value of the same channel (or bin) but for the different cells in the block.

Process 500 may include "provide cell-level HOG" 522. The normalized histogram is then appended to a HOG descriptor. Thereafter, the HOG descriptor (here referring to an image of cell-level HOGs) may be provided for object detection, object recognition, or feature extraction, and scene classification, video summarization, and so forth. For example, the HOG descriptor may be provided to a recognition application that may be based on supervised learning or a support vector machine (SVM) binary classifier which looks for an optimal hyperplane as a decision function. Once trained on images containing some particular object, an SVM classifier may make decisions regarding the presence of an object, such as a human, in additional test images. Other applications that may use the HOGs are pedestrian detection, car detectors, video key frame selection, abnormality detection, and so forth.

Since cell HOGs are generated independently of each other with the present low-complexity HOG generation method, it is possible to compute the cell HOGs in parallel, and multiple cell histogram computation modules can be integrated into hardware. This simple parallel hardware configuration permits a reduction of the needed circuit (circuit board or silicon) area to operate the HOG generation versus the conventional system. Often, reducing the circuit area may result in a lower number of chips per wafer which reduces costs and the power requirements of the circuit, which enables the present HOG generation method to be used on low cost chips.

Figure 11:
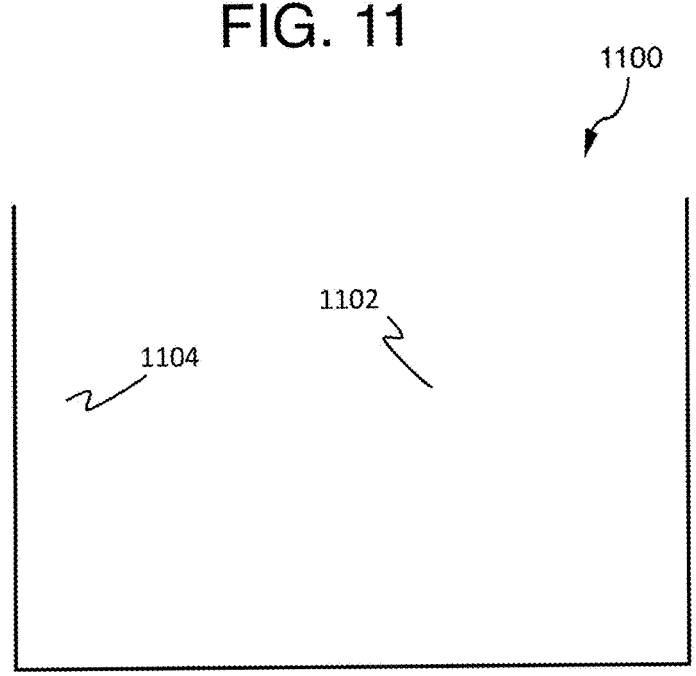
FIG. 11 is a graph to show recalculation rate and local memory usage versus tile width for performing memory transactions for generating histograms of gradients.

Referring to FIGS. 9-11, a memory transaction process may be implemented to further reduce the area of the local memory architecture to lower costs while minimizing power consumption and the computational load and complexity of the cell HOG generation. The memory transaction process may be implemented with the method and system of HOG generation described herein or other HOG generation processes as long as 2×2 cell block normalization is applied to normalize channel gradient values of initial cell-level HOGs of at least one of the cells of the block.

Referring to FIG. 9, and by a more specific example, the block-based normalization uses the four HOGs of the 2×2 cells in a block and obtains the four HOGs from memory, and often local temporary memory such as RAM or on-board memory such as cache. A previously computed HOG is kept in the memory until all of the block-based normalization is complete for any of the cells in a block in order to avoid dropping a generated HOG and then re-calculating the HOG as it is needed for the block-based normalization. Particularly, an image 900 is provided to explain the conventional cell memory transaction process. Cells 902 are stored in memory along a row as the initial HOGs are generated for each cell. Once the end of a row (an upper row) 904 is reached, the HOGs for the cells in the next lower row 906 are then generated. The cells with initial HOGs stored in memory are shown in gray. When four cells form a 2×2 block 908 (here formed of cells A, B, D, and E), the block-based normalization may be performed as indicated by dashed circle 910. The blocks may be formed along the row (here left to right) in the same direction as the cells are generated and saved to memory. The block may move in an overlapping manner such that cells ABDE are used for normalization, and then cells B, C, E, and F are used as the block for normalization. Once the normalization is complete, the upper left block (when moving left to right) is then dropped from memory (or simply not maintained in memory rather than actually being erased). In the present example then, when moving from block ABDE to block BCEF, cell A is dropped. Cell F is the newest cell to have a generated HOG and along lower row 906. Thus, the HOGs of the cells from the current block to the right end of the upper row 904 is maintained in memory as well as the HOGs from the cells from the left end of the lower row 906 to the current block. This portion of the lower row 906 is maintained because vertical block overlap is also used such that the lower row of cells 906 may become the upper row for the blocks once the normalization of the current upper row 904 is complete.

The memory size S required to operate this memory transaction process can be calculated with the following equation:

$$S = \left(\frac{w}{n} + 1\right) \times m \times d \qquad (14)$$

where w is an image width, n is a cell width, m is the number of channels used in the HOG, and d is a bit-resolution (bitsize) used for cell histogram values. The equation (14) indicates the required local memory size increases linearly with image resolution.

Referring to FIG. 10, in order to limit the memory size, the memory transaction strategy herein divides the input image into tiles with overlapping border cells. The tiles run in the opposite direction of the direction of cell HOG generation and storage. Thus, when cell HOGs are stored horizontally along rows, the tiles are vertical tiles that may extend the entire height of the image. The opposite could be true if the cell HOGs were stored in columns instead of rows, and then horizontal tiles could be used.

In the normal case where the cell HOGs are formed and stored along rows, the tiles have a width that is less than the width of the image. The cell generation and storage then proceeds in a tile-by-tile manner so that the cells in a tile are all processed before analyzing the cells in the next tile. This may proceed from tile to tile along the rows of the image in the direction of the cell HOG generation and storage, here left to right in the current example. This arrangement maintains the HOGs of horizontally adjacent cells of a single tile in memory (or precisely part of an upper row and part of a lower row of cells) instead of the cells of the row an entire image. Specifically, in the image 1000 for example, the HOG generation and storage proceeds just as with image 900 such that there is an upper row 1004 and a lower row 1006 that overlap to form a block 1008 of 2×2 cells for normalization, and where the normalization block is formed in overlapping fashion from left to right and from an upper end to a lower end of the image. Except here, the upper row 1004 and lower row 1006 with initial cell HOGs being generated and stored end at the border 1010 of a tile 1002. Once the processing for tile 1002 is complete, a new tile 1012 is set for processing to the immediate right of tile 1002.

Since it is possible to arbitrarily set the tile size, the tile size may be set much smaller than the size of the entire image. In that case, the local memory size can be decreased for memory-constrained conditions such as small devices and/or low power devices. This, however, is not the only constraint on the size of the tile. Except for the very first tile on the left edge of the image, all the rest of the tiles will have a left edge or first column of cells. If this first column in the tile is not normalized yet, then it is impossible to form a block of cells where the first column is on the right side of the normalization blocks. This is needed to maintain a consistent pattern of overlapping normalization blocks throughout the image. In order to resolve this, each tile after the first tile includes an overlapping column with overlapping cells from tile to tile. In other words, the last column of cells (the right-most column) in a tile is also the first, left-most column in the new adjacent tile to the subsequent tile. In this way, the first column of cell HOGs has already been normalized in the previous tile, but then can be used to form the left side of the normalization blocks in the new adjacent tile. This is shown on image 1000 with overlapping border cells 1014 and 1016 (where the column of cells 1016 are shared by tile 1002 where the HOGs are first generated and stored, and then in tile 1012).

It will be understood, however, that in order for this memory transaction operation to proceed, once a subsequent tile is complete, the HOGs of the cells of that tile are all removed from memory. Thus, the HOGs of a shared column of cells must be re-calculated for the new tile (and in the new row-by-row order in the new tile) so that the new tile may have the HOGs of its cells generated and stored in memory. While it is possible to maintain the cells of a tile in memory that will be needed to perform the normalization of the next tile (such as the right and/or left end cells), removing all cells once a tile is finished still provides better memory use reduction. Since the cell HOG re-calculation will also be required, if the tile is too small such that there are many tiles which increases the number of tile border cells, this may result in a large computational load to recalculate the cell HOGs, which in turn may increase the number of operations to perform, and therefore increase the time to perform the normalization as well as increase the power consumption.

Referring to FIG. 11, chart 1100 shows the local memory size and re-calculation rate change with respect to the tile width, and may be used to balance the tile size and memory size. An acceptable balance between the additional computation due to recalculation of cell HOGs on the one hand and circuit (or silicon) area as related to memory size on the other hand can be understood from chart 1100. Specifically, the local memory size linearly increases and the re-calculation rate exponentially decreases as the tile width becomes larger. Straight line 1102 shows the relationship between tile size and memory size, while curved line 1104 shows the relationship between re-calculation rate and tile size. These relationships are set by experimentation. One cell column is re-calculated in every tile where the formula is 1/(tile_width/cell_width). The specific condition of the last tile is ignored where image width is not a direct multiple of the tile width. The ideal tile size can be adjusted with experimentation. Thus, a very low amount of cell HOG recalculation can be achieved as local memory size is increased. However, increasing the memory size can increase the required circuit or silicon area to provide the memory, which may result in cost increase. Oppositely, by reducing local memory size, the circuit area and cost can be further reduced. As mentioned, reducing local memory, however, results in the increase of recalculation, which can increase the number of operations and the power consumption. To achieve balance between the power consumption to recalculate cell HOGs and the circuit area for local memory size, it has been found that setting a 5% re-calculation point is acceptable (where the lines on the chart 1100 cross). In other words, the parameters for memory size and re-calculation computational load (in %) are set where the tile width is the same for both of these. When the width of a tile is set to 20 cells (i.e., 160 pixels) for a screen of 720p, a 378-bit local memory would be sufficient at the cost of 5% re-calculation rate of the cell histograms. It should be noted that performance in terms of a percentage of re-calculation versus memory usage is not generally affected by the image size. This enables a low-cost, low power solution for the memory-constrained approach.

Referring to FIG. 12, process 1200 illustrates the operation of a sample image processing system 1300 that performs low-complexity HOG generation for image processing in accordance with at least some implementations of the present disclosure. In more detail, in the illustrated form, process 1200 may include one or more operations, functions or actions as illustrated by one or more of actions 1202 to 1232 numbered evenly. By way of non-limiting example, process 1200 will be described herein with reference to FIG. 13. Specifically, system 1300 includes logic units or modules 1304. The logic modules 1304 may include an image unit 1306, a cell retrieval unit 1310, a HOG generation unit 1312, and a feature extraction/object detection application 1323. The operation of the system may proceed as follows.

Process 1200 may include "receive image data" 1202, and that is as described with process 400 or 500 above where image data is provided with pixel values for luminance, color, or both types of data.

Process 1200 may include "obtain tile dimensions" 1204, and particularly, the tile width in pixels when the HOG cell generation will occur row-by-row. As mentioned by one example, the tile width may be set where the tile width is the same for both a recalculation computational load function and a local memory size function as shown on chart 1100, and in this example, at a width of about 160 pixels. Depending on the real-time latency constraint of the system, the optimal tile size can be set depending on the input image size. Also, tile width sizes could be set differently for different image sizes as long as the real-time latency constraints are satisfied.

Process 1200 may include "obtain data of cell of tile" 1206. The process 1200 then obtains the image data of a first cell and including the color and/or luminance data of the pixels in the cell. This may include obtaining cell data one cell at a time or may include obtaining the data of a number of cells or even all cells in an image for parallel processing for at least some of the operations described herein and as explained below.

Process 1200 may include "obtain horizontal and vertical gradient components of the cell pixels" 1208, and as explained above, [−1 0 1] filter kernels may be used to determine the horizontal and vertical gradient components for individual pixels of a cell. Again for this operation, this may occur cell by cell as the cell as needed, or the gradient components may be determined for all of the pixels in the image, especially when the pixel gradient components may be used for tasks other than HOG generation.

Process 1200 may include "find channels for pixel gradient components" 1210, and this operation may be performed on a cell by cell basis. Thus, as mentioned with the memory transaction strategy, the gradient components of the pixels of a first upper left cell in an image may be obtained, and the cells may then be processed along and down the rows, one by one, in raster fashion. Also as explained above, this operation may include preliminarily setting the parameters for the channels, such as the present example that uses nine non-sign sensitive 20 degree channels covering 180 degrees (FIG. 7). Other channel parameters are possible.

This operation then may include using a channel finder that uses the gradient components of the individual pixels in the cell to assign the horizontal and vertical gradient components of the pixels to the channels. As mentioned above, this is accomplished by determining a hypothetical gradient component at the boundary of the channel(s) and comparing the actual gradient component(s) of a pixel to the hypothetical values. When the actual value is within a range (or over a threshold) or other criteria defined by the hypothetical values, the gradient components of that pixel are assigned to that channel.

Process 1200 may include "accumulate gradients in channels" 1212. Also as mentioned above, once all of horizontal and vertical gradient components of a cell are assigned to the channels, the gradient components of a channel are used to form a vector sum (a total horizontal gradient and a total vertical gradient) for that channel. This may then also include finding the norm of the vector sum before determining the gradient magnitude and orientation for the individual channels.

Process 1200 may include "compute per channel gradient magnitude and orientation" 1214, and as mentioned above, by using the horizontal and vertical values of the vector sum to calculate a gradient magnitude of the channel using the square root formula, and determining a gradient orientation of the channel by using the arctan operation.

Process 1200 may include "revise channel gradient magnitude and orientation by histogram voting" 1216. This operation is also explained above, and revises the channel gradient values by factoring in the gradient values in neighbor cells (when they are already present). As mentioned, this may be performed by using blocks of 2×2 cells, and determining the relative distances from each pixel in the four cells to a common or relative spatial location (such as the center of the four cells), and then multiplying the distances by the gradient magnitude of the pixel. By one form, this operation is not performed until there is an arrangement of the channel gradients of 2×2 cells in memory, similar to the block-based normalization.

Process 1200 may include "store initial cell-level HOG" 1218. Also as mentioned previously, after histogram voting, this operation may include generating and storing the resulting initial cell HOGs in local memory (such as RAM or cache). The cell HOGs may be generated and stored according to the memory transaction strategy described, and specifically row by row within a set tile.

Then, process 1200 may include "perform block normalization when 2×2 cell histograms are present" 1220. Thus, once the initial cell histograms in storage form the 2×2 block of cells while being generated and stored in row by row fashion within the tile, the block-based normalization may be applied, and in one form ($L_\infty$) normalization until all four cells in the block have been normalized as described above.

Process 1200 may include "provide normalized HOG" 1222. The cell level-hogs then may be appended to HOG descriptor (an image HOG), and provided to object detection, feature extraction, or other applications as already described above.

Process 1200 may include "drop earliest initial cell-level HOG of block from memory" 1224. When the process is not yet at the end of an image (or the last of all cells on an image to be processed), the earliest initial cell Hog is dropped. In the memory transaction strategy, the dropped HOG will be for the upper left cell of the 2×2 block of cells that was just normalized unless the block is at the end of a row of a tile.

Process 1200 may include "obtain next cell on row in tile if not end of tile row" 1226. Thus, the process then continues with operation 1208 again to begin the processing of the next cell and complete the next 2×2 cell block for normalization. Thus, this effectively acts to shift the normalization block one column to the right in a tile Process 1200 may include "go to next row in tile if at end of tile row" 1228, and particularly to start the lower row that will form the lower row in the next block of 2×2 cells for normalization. The process then continues with operation 1208 again to begin the processing of the next cell.

Process 1200 may include "start new tile next to current tile if at end of tile" 1230, and as explained above, by forming the new tile to the right of the subsequent tile along the rows when cell HOGs are generated and stored left to right along an image. Also as mentioned, the right-most column of the previous tile will be the same as the left-most or first column of the new tile such that the HOGs for the cells in that column are to be re-calculated. The process then continues with operation 1208 again to begin the processing of the next cell.

Process 1200 may include "end if end of last tile" 1232, and the process may complete by providing the last normalized cells on the last row of the last tile for further processing according to operation 1222.

In addition, any one or more of the operations of FIGS. 4, 5, and 12 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 13:
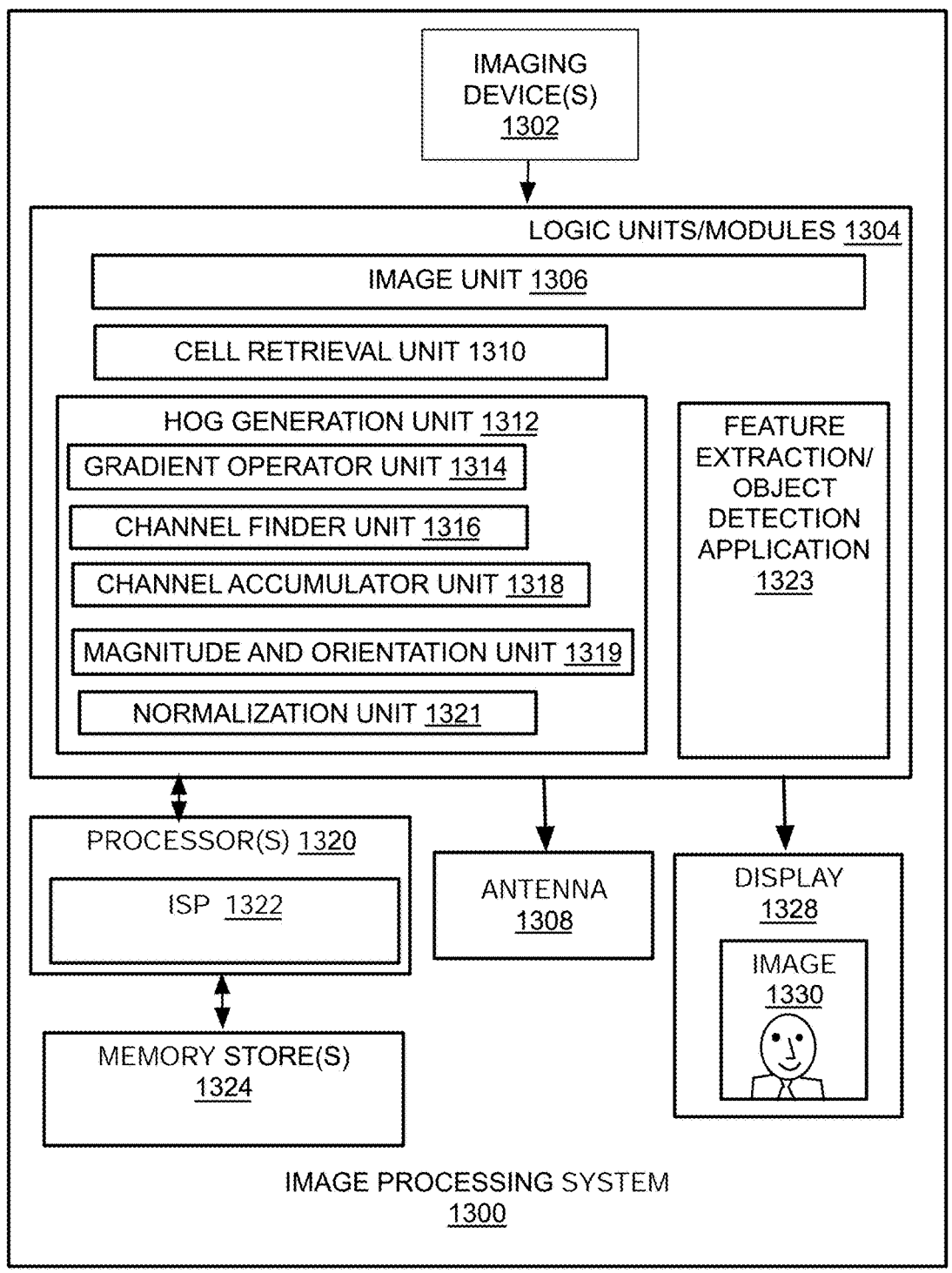
FIG. 13 is an illustrative diagram of an example system.

Referring to FIG. 13, an example image processing system 1300 is arranged in accordance with at least some implementations of the present disclosure. In various implementations, the example image processing system 1300 may have an imaging device 1302 to form or receive captured image data. This can be implemented in various ways. Thus, in one form, the image processing system 1300 may be one or more digital cameras or other image capture devices, and imaging device 1302, in this case, may be the camera hardware and camera sensor software, module, or component 1304. In other examples, imaging processing system 1300 may have an imaging device 1302 that includes or may be one or more cameras, and logic modules 1304 may communicate remotely with, or otherwise may be communicatively coupled to, the imaging device 1302 for further processing of the image data.

Thus, image processing device 1300 may be, or may be part of, or may be in communication with, a smartphone, tablet, laptop, or other mobile device such as wearables including smart glasses, smart headphones, exercise bands, and so forth. In any of these cases, such technology may include a camera such as a digital camera system, a dedicated camera device, or an imaging phone or tablet, whether a still picture or video camera, camera that provides a preview screen, or some combination of these. Thus, in one form, imaging device 1302 may include camera hardware and optics including one or more sensors as well as auto-focus, zoom, aperture, ND-filter, auto-exposure, flash, and actuator controls. The imaging device 1302 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. In other examples, an RGB-Depth camera and/or microphone-array might be used in addition to or in the alternative to a camera sensor. In some examples, imaging device 1302 may be provided with an eye tracking camera.

In the illustrated example, the logic modules 1304 may include an image unit 1306 that pre-processes raw image data and otherwise provides image data ready for HOG generation as described herein. The image unit 1306 also may include any other image processing that is not directly related to the HOG generation such as encoding and/or decoding of the image data. The logic modules 1304 also may include a cell retrieval unit 1310, a HOG generation unit 1312, and a feature extraction application(s) 1323. The cell retrieval unit 1310 provides the memory transaction instructions according to the memory reduction process described herein and may be considered a separate module or part of the HOG generation unit 1310, and may reside in volatile or non-volatile memory or may be on-board one of the processing chips mentioned herein (or as part of a system-on-chip processor). Otherwise, the HOG generation unit 1312 may include a gradient operator unit 1314, channel finder unit 1316, channel accumulator unit 1318, magnitude and orientation unit 1319, and normalization unit 1321, all of which were described above. Any combination of the units of the logic modules 1304 may be operated by, or even entirely or partially located at, processor(s) 1320, and which may include an ISP 1322. The logic modules 1304 may be communicatively coupled to the components of the imaging device 1302 in order to receive image data that includes data to apply HOG generation.

As mentioned, the image processing system 1300 may have one or more processors 1320 which may include a dedicated image signal processor (ISP) 1322 such as the Intel Atom, memory stores 1324 which may or may not hold input image data and/or intermediate or final HOGs as mentioned herein, one or more displays 1328 to provide images 1330, and antenna 1308. In one example implementation, the image processing system 1300 may have the display 1328, at least one processor 1320 communicatively coupled to the display, and at least one memory 1324 communicatively coupled to the processor. The encoder of the image unit 1306 and antenna 1308 may be provided to compress the modified image date for transmission to other devices that may display or store the image. It will be understood that the image processing system 1300 also may include a decoder (or the encoder may include a decoder) to receive and decode image data for processing by the system 1300. Otherwise, the processed image 1330 may be displayed on display 1328 or stored in memory 1324. As illustrated, any of these components may be capable of communication with one another and/or communication with portions of logic modules 1304 and/or imaging device 1302. Thus, processors 1320 may be communicatively coupled to both the image device 1302 and the logic modules 1304 for operating those components. By one approach, although image processing system 1300, as shown in FIG. 13, may include one particular set of blocks or actions associated with particular components or modules, these blocks or actions may be associated with different components or modules than the particular component or module illustrated here.

Figure 14:
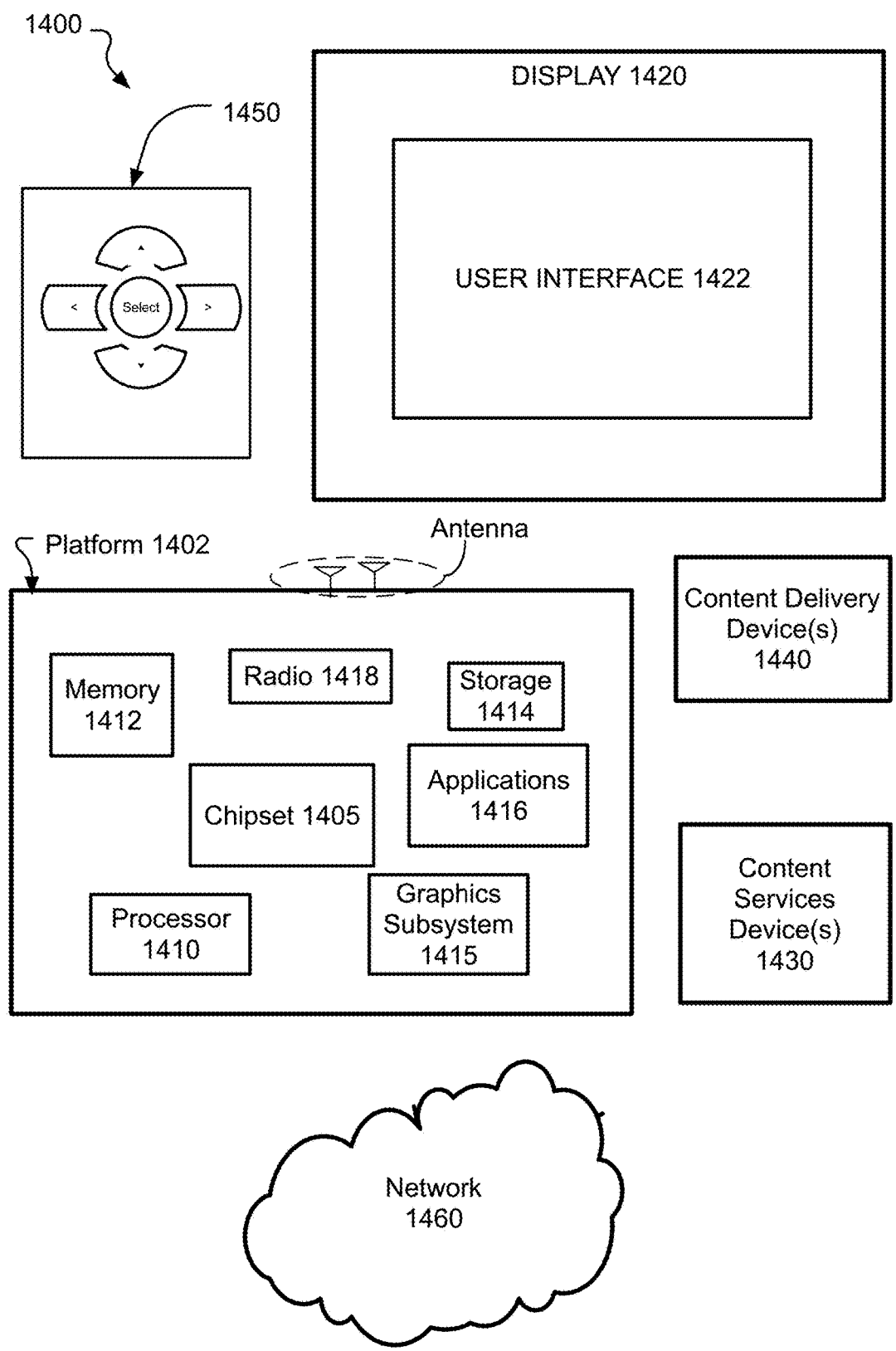
FIG. 14 is an illustrative diagram of another example system.

Referring to FIG. 14, an example system 1400 in accordance with the present disclosure operates one or more aspects of the image processing system described herein. It will be understood from the nature of the system components described below that such components may be associated with, or used to operate, certain part or parts of the image processing system 1300 described above. In various implementations, system 1400 may be a media system although system 1400 is not limited to this context. For example, system 1400 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402 and/or display 1420. Each of these components is described in greater detail below.

In various implementations, platform 1402 may include any combination of a chipset 1405, processor 1410, memory 1412, storage 1414, graphics subsystem 1415, applications 1416 and/or radio 1418. Chipset 1405 may provide intercommunication among processor 1410, memory 1412, storage 1414, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, Display Port, wireless HDMI, and/or wireless HD compliant techniques. Graphics subsystem 1415 may be integrated into processor 1410 or chipset 1405. In some implementations, graphics subsystem 1415 may be a stand-alone card communicatively coupled to chipset 1405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of unidirectionally or bidirectionally communicating content between content providers and platform 1402 and/display 1420, via network 1460 or directly. It will be appreciated that the content may be communicated unidirectionally and/or bidirectionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of controller 1450 may be used to interact with user interface 1422, for example. In implementations, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1450 may be replicated on a display (e.g., display 1420) by movements of a pointer, cursor, focus ring, or other visual indicators displayed on the display. For example, under the control of software applications 1416, the navigation features located on navigation controller 1450 may be mapped to virtual navigation features displayed on user interface 1422, for example. In implementations, controller 1450 may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various implementations, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various implementations, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 14.

Figure 15:
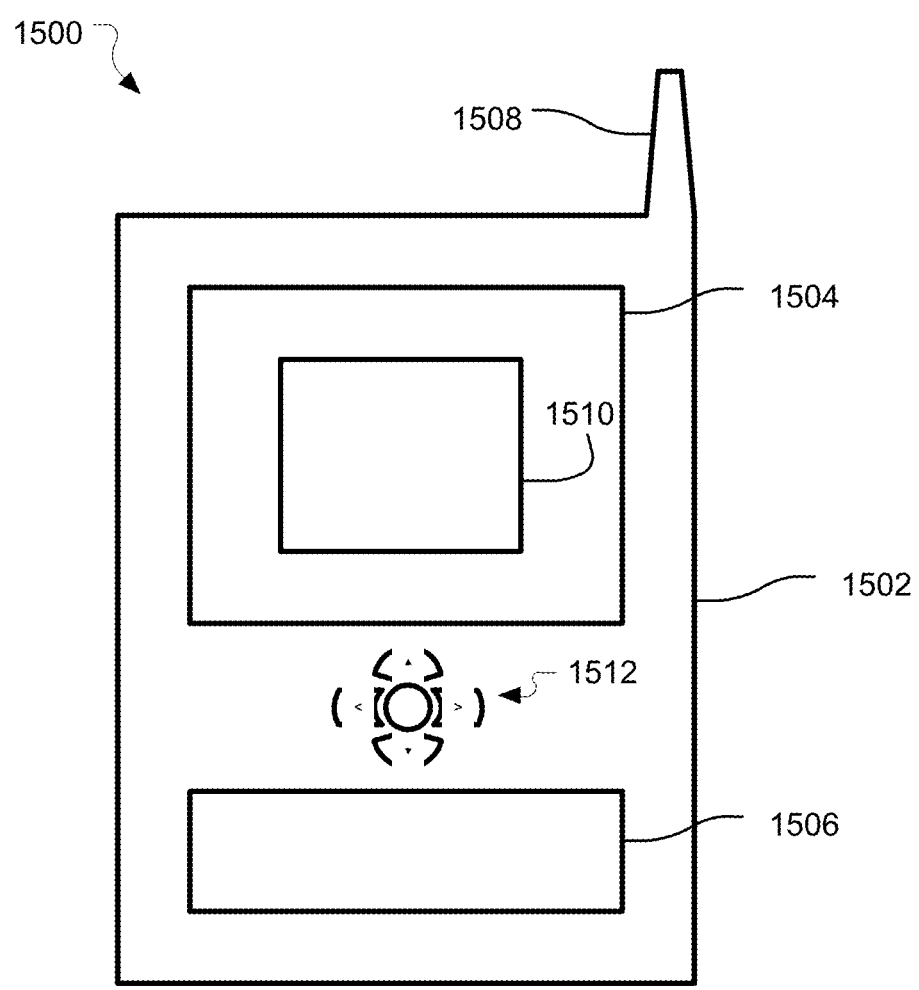
FIG. 15 illustrates another example device, all arranged in accordance with at least some implementations of the present disclosure.

Referring to FIG. 15, a small form factor device 1500 is one example of the varying physical styles or form factors in which system 1300 and/or 1400 may be embodied. By this approach, device 1500 may be implemented as a mobile computing device having wireless capabilities and multiple cameras. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet with or without multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 15, device 1500 may include a housing 1502, a display 1504 including a screen 1510, an input/output (I/O) device 1506, and an antenna 1508. Device 1500 also may include navigation features 1512. Display 1504 may include any suitable display unit for displaying information appropriate for a mobile computing device. I/O device 1506 may include any suitable I/O device for entering information into a mobile computing device. Examples for I/O device 1506 may include an alphanumeric keyboard, a numeric keypad, a touch pad, input keys, buttons, switches, rocker switches, microphones, speakers, voice recognition device and software, and so forth. Information also may be entered into device 1500 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of histogram of gradients generation for image processing comprises obtaining image data comprising horizontal and vertical gradient components of individual pixels of an image; associating the horizontal and vertical gradient components of the same pixel with one of a plurality of angular channels depending on the values of the horizontal and vertical gradient components; determining a gradient magnitude and a gradient orientation of individual angular channels after the horizontal and vertical gradient components are assigned to the channels; and generating a histogram of gradients by using the gradient direction and gradient magnitude of the angular channels.

By another implementation, the method also includes that the histograms of gradients each having a gradient distribution and are formed for individual cells of about 8×8 pixels of the image; wherein associating individual pixels with one of a plurality of angular channels comprises comparing at least one of the gradient components to boundary values of the angular channels. The method comprises determining a hypothetical boundary gradient component magnitude of the angle at at least one boundary of at least one of the angular channels; and comparing the value of the gradient components of the pixels to the hypothetical boundary gradient component magnitude to determine whether a pixel should be associated with the angular channel; multiplying one of the gradient components of a pixel by the tangent of at least one angle at a boundary of the angular channels to calculate a hypothetical gradient component magnitude of the other gradient component of the same pixel; comparing the value of the other of the gradient component of the same pixel to the hypothetical gradient component magnitude, wherein comparing the value of the other gradient component determines two possible angular channels to associate the gradient components to; selecting one of the two possible angular channels to associate the gradient components to depending on whether the value of one of the gradient components of the pixel is positive or negative, wherein the gradient components are associated with an angular channel without using square root operations to determine a gradient magnitude, arctan operations to determine a gradient angle, or both; generating a gradient magnitude and a gradient orientation of the individual channels based, at least in part, on a vector sum formed by using the gradient components of multiple pixels assigned to the same channel; normalizing the vector sum before determining a final gradient magnitude and gradient orientation for the individual channels; performing histogram voting to refine the gradient values of the channels of a current cell by using bilinear interpolation with the gradient values of the cells near the current cell; and performing block-based normalization wherein each block has multiple cells wherein each cell has an initial histogram of gradients formed of the gradient magnitude or gradient orientation or both of the individual channels of the cell, wherein the normalization compares the gradient magnitude or gradient orientations or both of the channels from cell to cell in the block; and applying L(infinity) normalization to the blocks.

By other approaches, the operations provided by the method may similarly be provided by a system, and particularly, a computer-implemented system that has a display, at least one memory communicatively coupled to the display, at least one processor communicatively coupled to the display and the memory, and a histogram of gradients generation unit operated by the at least one processor and to obtain image data comprising horizontal and vertical gradient components of individual pixels of an image; associate the horizontal and vertical gradient components of the same pixel with one of a plurality of angular channels depending on the values of the horizontal and vertical gradient components; determine a gradient direction and a gradient magnitude of individual angular channels after the horizontal and vertical gradient components are assigned to the channels; and generate a histogram of gradients by using the gradient direction and gradient magnitude of the angular channels.

By other approaches, the system may comprise the histogram of gradients generation unit to provide that an initial histogram of gradients is formed for individual cells of a group of pixels of an image, and wherein block-based normalization of blocks each having multiple cells, and wherein the block-based normalization is performed to form a modified histogram of gradients of each cell in the block; wherein the block is formed of an upper row of cells on an image and an adjacent lower row of cells on an image. Also, the histogram of gradients generation unit is to set a tile that is less than an entire row of an image so that the cells are stored in raster manner within a tile and used for block-based normalization in the tile before moving to a next tile having another portion of the rows of the image; wherein the histogram of gradients generation unit is to re-calculate the gradient values of cells along a shared edge of two tiles, and wherein the tile width is set by considering how many cells will have re-calculated histograms on an entire image; wherein the tile width is set to minimize the number of initial histogram of gradients of the cells to be placed in memory at the same time while minimizing the number of cells with histograms to be re-calculated at the edges of the tiles; wherein the tile width is set along a row of an image at least depending on the image width, a cell width, the number of channels in the histogram of gradients, and the maximum bit size of the values on the histograms of gradients; and wherein the tile width is about 160 pixels along a row of an image, wherein the tile width is set so that about 5% of the cells in a tile have a histogram of gradients that is re-calculated.

By one approach, the features provided by the method and/or system may be provided by at least one computer readable medium that comprises a plurality of instructions that in response to being executed on a computing device, causes the computing device to obtain image data comprising horizontal and vertical gradient components of individual pixels of an image; associate the horizontal and vertical gradient components of the same pixel with one of a plurality of angular channels depending on the values of the horizontal and vertical gradient components; determine a gradient direction and a gradient magnitude of individual angular channels after the horizontal and vertical gradient components are assigned to the channels; and generate a histogram of gradients by using the gradient direction and gradient magnitude of the angular channels.

By a further approach, the instructions may cause the computing device to wherein the histograms of gradients each having a gradient distribution and are formed for individual cells of about 8×8 pixels of the image; and wherein associating individual pixels with one of a plurality of angular channels comprises comparing at least one of the gradient components to boundary values of the angular channels. The instructions cause the computing device to determine a hypothetical boundary gradient component magnitude of the angle at at least one boundary of at least one of the angular channels; and compare the value of the gradient components of the pixels to the hypothetical boundary gradient component magnitude to determine whether a pixel should be associated with the angular channel; multiply one of the gradient components of a pixel by the tangent of at least one angle at a boundary of the angular channels to calculate a hypothetical gradient component magnitude of the other gradient component of the same pixel; compare the value of the other of the gradient component of the same pixel to the hypothetical gradient component magnitude, wherein comparing the value of the other gradient component determines two possible angular channels to associate the gradient components to; select one of the two possible angular channels to associate the gradient components to depending on whether the value of one of the gradient components of the pixel is positive or negative, wherein the gradient components are associated with an angular channel without using square root operations to determine a gradient magnitude, arctan operations to determine a gradient angle, or both; generate a gradient magnitude and a gradient orientation of the individual channels based, at least in part, on a vector sum formed by using the gradient components of multiple pixels assigned to the same channel; normalize the vector sum before determining a final gradient magnitude and gradient orientation for the individual channels; perform histogram voting to refine the gradient values of the channels of a current cell by using bilinear interpolation with the gradient values of the cells near the current cell; and perform block-based normalization wherein each block has multiple cells wherein each cell has an initial histogram of gradients formed of the gradient magnitude or gradient orientation or both of the individual channels of the cell, wherein the normalization compares the gradient magnitude or gradient orientations or both of the channels from cell to cell in the block; and applying L(infinity) normalization to the blocks.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of histogram of gradients generation for image processing comprising:
    obtaining image data comprising horizontal and vertical gradient components of individual pixels of an image;
    associating the horizontal and vertical gradient components of the same pixel with one of a plurality of angular channels depending on the values of the horizontal and vertical gradient components;
    determining a gradient magnitude and a gradient orientation of individual angular channels after the horizontal and vertical gradient components are assigned to the channels, wherein the gradient orientation of individual angular channels is determined using an arctan operation without first performing an arctan operation on the individual pixels; and
    generating a histogram of gradients by using the gradient direction and gradient magnitude of the angular channels;
    performing block-based normalization wherein each block has multiple cells wherein each cell has an initial histogram of gradients formed of the gradient magnitude or gradient orientation or both of the individual channels of the cell, wherein the normalization compares the gradient magnitude or gradient orientation or both of the channels from cell to cell in the block.

2. The method of claim 1 wherein the histograms of gradients each having a gradient distribution and are formed for individual cells of about 8×8 pixels of the image.

3. The method of claim 1 wherein associating individual pixels with one of a plurality of angular channels comprises comparing at least one of the gradient components to boundary values of the angular channels.

4. The method of claim 3 comprising determining a hypothetical boundary gradient component magnitude of the angle at at least one boundary of at least one of the angular channels; and
    comparing a value of at least one of the gradient components of the pixels to the hypothetical boundary gradient component magnitude to determine whether a pixel should be associated with the angular channel.

5. The method of claim 3 comprising multiplying one of the gradient components of a pixel by the tangent of at least one angle at a boundary of the angular channels to calculate a hypothetical gradient component magnitude of the other gradient component of the same pixel.

6. The method of claim 5 comprising comparing the value of the other of the gradient component of the same pixel to the hypothetical gradient component magnitude.

7. The method of claim 6 wherein comparing the value of the other gradient component determines two possible angular channels to associate the gradient components to, the method comprising selecting one of the two possible angular channels to associate the gradient components to depending on whether the value of one of the gradient components of the pixel is positive or negative.

8. The method of claim 1 wherein the gradient components are associated with an angular channel without using square root operations to determine a gradient magnitude, arctan operations to determine a gradient angle, or both.

9. The method of claim 1 comprising generating a gradient magnitude and a gradient orientation of the individual channels based, at least in part, on a vector sum formed by using the gradient components of multiple pixels assigned to the same channel.

10. The method of claim 9 comprising normalizing the vector sum before determining a final gradient magnitude and gradient orientation for the individual channels based, at least in part, on the normalized vector sum.

11. The method of claim 1 comprising performing histogram voting to refine one or more gradient values of the channels of a current cell based at least in part on bilinear interpolation with the gradient values of the cells near the current cell.

12. The method of claim 1 comprising applying L(infinity) normalization as a maximum value among all absolute values of contrast normalization factors-during the-block-based normalization.

13. The method of claim 1 wherein the histograms of gradients each having a gradient distribution and are formed for individual cells of about 8×8 pixels of the image;
    wherein associating individual pixels with one of a plurality of angular channels comprises comparing at least one of the gradient components to boundary values of the angular channels;
    the method comprising:
    determining a hypothetical boundary gradient component magnitude of the angle at at least one boundary of at least one of the angular channels; and
    comparing a value of at least one of the gradient components of the pixels to the hypothetical boundary gradient component magnitude to determine whether a pixel should be associated with the angular channel;
    multiplying one of the gradient components of a pixel by the tangent of at least one angle at a boundary of the angular channels to calculate a hypothetical gradient component magnitude of the other gradient component of the same pixel;

comparing the value of the other of the gradient component of the same pixel to the hypothetical gradient component magnitude, wherein comparing the value of the other gradient component determines two possible angular channels to associate the gradient components to;

selecting one of the two possible angular channels to associate the gradient components to depending on whether the value of one of the gradient components of the pixel is positive or negative, wherein the gradient components are associated with an angular channel without using square root operations to determine a gradient magnitude, arctan operations to determine a gradient angle, or both;

generating a gradient magnitude and a gradient orientation of the individual channels based, at least in part, on a vector sum formed by using the gradient components of multiple pixels assigned to the same channel;

normalizing the vector sum before determining a final gradient magnitude and gradient orientation for the individual channels based, at least in part, on the normalized vector sum;

performing histogram voting to refine one or more gradient values of the channels of a current cell based at least in part on bilinear interpolation with the gradient values of the cells near the current cell;

and applying L(infinity) normalization as a maximum value among all absolute values of contrast normalization factors during the-block-based normalization.

14. A computer-implemented system comprising:
at least one display;
at least one memory;
at least one processor communicatively coupled to the at least one memory and at least one display; and
a histogram of gradients generation unit operated by the at least one processor and to:
  obtain image data comprising horizontal and vertical gradient components of individual pixels of an image;
  associate the horizontal and vertical gradient components of the same pixel with one of a plurality of angular channels depending on the values of the horizontal and vertical gradient components;
  determine a gradient direction and a gradient magnitude of individual angular channels after the horizontal and vertical gradient components are assigned to the channels, wherein the gradient orientation of individual angular channels is determined using an arctan operation without first performing an arctan operation on the individual pixels; and
  generate a histogram of gradients by using the gradient direction and gradient magnitude of the angular channels;
wherein an initial histogram of gradients is formed for individual cells of a group of pixels of the image, and wherein block-based normalization of blocks each having multiple cells, and wherein the block-based normalization is performed to form a modified histogram of gradients of each cell in the block.

15. The system of claim 14 wherein the block is formed of an upper row of cells on the image and an adjacent lower row of cells on the image, and wherein the histogram of gradients generation unit is to set a tile that is less than an entire row of the image so that the cells are stored in raster manner within a tile and used for block-based normalization in the tile before moving to a next tile having another portion of the rows of the image.

16. The method of claim 15 wherein the histogram of gradients generation unit is to re-calculate one or more gradient values of cells along a shared edge of two tiles, and wherein the tile width is set by considering how many cells will have re-calculated histograms on an entirety of the image.

17. The system of claim 15 wherein the tile width is set to minimize the number of initial histogram of gradients of the cells to be placed in memory at the same time while minimizing the number of cells with histograms to be re-calculated at the edges of the tiles.

18. The system of claim 15 comprising setting the tile width along a row of the image at least depending on one or more of the following: the image width, a cell width, a number of channels in the histogram of gradients, and/or a maximum bit size of values on the histograms of gradients.

19. The system of claim 15 wherein the tile width is about 160 pixels along a row of the image.

20. The system of claim 15 wherein the tile width is set so that about 5% of the cells in a tile have a histogram of gradients that is re-calculated.

21. The system of claim 14
wherein the block is formed of an upper row of cells on the image and an adjacent lower row of cells on the image, and wherein the histogram of gradients generation unit is to set a tile that is less than an entire row of the image so that the cells are stored in raster manner within a tile and used for block-based normalization in the tile before moving to a next tile having another portion of the rows of the image;
wherein the histogram of gradients generation unit is to re-calculate one or more gradient values of cells along a shared edge of two tiles, and wherein the tile width is set by considering how many cells will have re-calculated histograms on an entirety of the image;
wherein the tile width is set to minimize the number of initial histogram of gradients of the cells to be placed in memory at the same time while minimizing the number of cells with histograms to be re-calculated at the edges of the tiles;
wherein the tile width is set along a row of the image at least depending on one or more of the following: the image width, a cell width, a number of channels in the histogram of gradients, and/or a maximum bit size of values on the histograms of gradients;
wherein the tile width is about 160 pixels along a row of the image, wherein the tile width is set so that about 5% of the cells in a tile have a histogram of gradients that is re-calculated.

22. A non-transitory computer-readable medium having stored thereon instructions that when executed cause a computing device to perform the following operations, comprising:
obtain image data comprising horizontal and vertical gradient components of individual pixels of an image;
associate the horizontal and vertical gradient components of the same pixel with one of a plurality of angular channels depending on the values of the horizontal and vertical gradient components;
determine a gradient direction and a gradient magnitude of individual angular channels after the horizontal and vertical gradient components are assigned to the channels, wherein the gradient orientation of individual angular channels is determined using an arctan operation without first performing an arctan operation on the individual pixels; and generate a histogram of gradients by using the gradient direction and gradient magnitude of the angular channels;
  wherein associating individual pixels with one of a plurality of angular channels comprises comparing at least one of the gradient components to boundary values of the angular channels; and
  the instructions causing the computing device to multiply one of the gradient components of a pixel by the tangent of at least one angle at a boundary of the angular channels to calculate a hypothetical gradient component magnitude of the other gradient component of the same pixel.

23. The non-transitory computer-readable medium of claim 22 wherein the histograms of gradients each having a gradient distribution and are formed for individual cells of about 8×8 pixels of the image;
  the instructions causing the computing device to:
  determine a hypothetical boundary gradient component magnitude of the angle at at least one boundary of at least one of the angular channels; and
  compare a value of at least one of the gradient components of the pixels to the hypothetical boundary gradient component magnitude to determine whether a pixel should be associated with the angular channel;
  compare the value of the other of the gradient component of the same pixel to the hypothetical gradient component magnitude, wherein comparing the value of the other gradient component determines two possible angular channels to associate the gradient components to;
  select one of the two possible angular channels to associate the gradient components to depending on whether the value of one of the gradient components of the pixel is positive or negative, wherein the gradient components are associated with an angular channel without using square root operations to determine a gradient magnitude, arctan operations to determine a gradient angle, or both;
  generate a gradient magnitude and a gradient orientation of the individual channels based, at least in part, on a vector sum formed by using the gradient components of multiple pixels assigned to the same channel;
  normalize the vector sum before determining a final gradient magnitude and gradient orientation for the individual channels based, at least in part, on the normalized vector sum;
  perform histogram voting to refine one or more gradient values of the channels of a current cell based at least in part on bilinear interpolation with the gradient values of the cells near the current cell; and
  perform block-based normalization wherein each block has multiple cells wherein each cell has an initial histogram of gradients formed of the gradient magnitude or gradient orientation or both of the individual channels of the cell, wherein the normalization compares the gradient magnitude or gradient orientations or both of the channels from cell to cell in the block; and applying L(infinity) normalization as a maximum value among all absolute values of contrast normalization factors during the-block-based normalization.

24. The non-transitory computer-readable medium of claim 22 wherein the instructions cause the computing device to compare the value of the other of the gradient component of the same pixel to the hypothetical gradient component magnitude.

25. A computer-implemented method of histogram of gradients generation for image processing comprising:
  obtaining image data comprising horizontal and vertical gradient components of individual pixels of an image;
  associating the horizontal and vertical gradient components of the same pixel with one of a plurality of angular channels depending on the values of the horizontal and vertical gradient components;
  determining a gradient magnitude and a gradient orientation of individual angular channels after the horizontal and vertical gradient components are assigned to the channels wherein the gradient orientation of individual angular channels is determined using an arctan operation without first performing an arctan operation on the individual pixels; and
  generating a histogram of gradients by using the gradient direction and gradient magnitude of the angular channels;
  generating the gradient magnitude and the gradient orientation of the individual angular channels based, at least in part, on a vector sum formed by using the gradient components of multiple pixels assigned to the same channel; and
  normalizing the vector sum before determining a final gradient magnitude and gradient orientation for the individual channels based, at least in part, on the normalized vector sum.

\* \* \* \* \*